(12) United States Patent
Suga

(10) Patent No.: US 9,544,879 B2
(45) Date of Patent: Jan. 10, 2017

(54) WIRELESS COMMUNICATION SYSTEM, METHOD FOR WIRELESS COMMUNICATION, RELAY STATION, AND WIRELESS BASE STATION

(71) Applicant: FUJITSU LIMITED, Kawasaki-shi, Kanagawa (JP)

(72) Inventor: Junichi Suga, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 60 days.

(21) Appl. No.: 14/574,450

(22) Filed: Dec. 18, 2014

(65) Prior Publication Data

US 2015/0215902 A1    Jul. 30, 2015

(30) Foreign Application Priority Data

Jan. 24, 2014    (JP) .................................. 2014-011041

(51) Int. Cl.
| | |
|---|---|
| H04W 72/04 | (2009.01) |
| H04W 28/06 | (2009.01) |
| H04B 7/155 | (2006.01) |
| H04W 84/04 | (2009.01) |

(52) U.S. Cl.
CPC ......... *H04W 72/04* (2013.01); *H04B 7/15542* (2013.01); *H04W 28/06* (2013.01); *H04W 84/047* (2013.01)

(58) Field of Classification Search
CPC .......................... H04W 72/04; H04W 72/0413
USPC .. 455/450, 451, 452.1, 452.2, 453; 370/315, 338
See application file for complete search history.

(56) References Cited

U.S. PATENT DOCUMENTS

| | | | | |
|---|---|---|---|---|
| 6,577,641 B1* | 6/2003 | Izumi | ................... | H04B 7/2643 370/347 |
| 8,248,941 B2* | 8/2012 | Teyeb | ................. | H04B 7/2606 370/235 |
| 2008/0285499 A1* | 11/2008 | Zhang | .................... | H04B 7/155 370/315 |
| 2009/0016290 A1 | 1/2009 | Chion et al. | | |
| 2009/0303918 A1* | 12/2009 | Ma | ....................... | H04B 7/2606 370/315 |
| 2010/0309808 A1* | 12/2010 | Miki | ..................... | H04L 1/1607 370/252 |
| 2012/0008546 A1* | 1/2012 | Yokoyama | ......... | H04B 7/15542 370/315 |
| 2012/0033606 A1* | 2/2012 | Chun | ................. | H04B 7/15528 370/315 |
| 2012/0140666 A1* | 6/2012 | Takahashi | ........... | H04W 76/025 370/252 |
| 2012/0201192 A1* | 8/2012 | Hong | ................. | H04B 7/15521 370/315 |

(Continued)

FOREIGN PATENT DOCUMENTS

| | | |
|---|---|---|
| JP | 2010-532973 | 10/2010 |
| JP | 2012-44336 | 3/2012 |
| JP | 2012-231263 | 11/2012 |

*Primary Examiner* — Christopher M Brandt
(74) *Attorney, Agent, or Firm* — Fujitsu Patent Center

(57) ABSTRACT

A wireless communication system includes: a wireless base station; and a relay station that receives data periodically transmitted from each of a plurality of terminals, and transmits the received data to the wireless base station in accordance with an allocation pattern of a wireless resource based on the size of the data and the period of the transmission for each of the plurality of terminals.

15 Claims, 21 Drawing Sheets

(56) References Cited

U.S. PATENT DOCUMENTS

| | | |
|---|---|---|
| 2012/0236782 A1* | 9/2012 | Bucknell ................ H04B 7/155 370/315 |
| 2013/0107797 A1 | 5/2013 | Chion et al. |
| 2013/0121195 A1* | 5/2013 | Sundaresan ......... H04W 72/085 370/252 |
| 2013/0201897 A1 | 8/2013 | Morioka et al. |
| 2013/0208690 A1* | 8/2013 | Nishikawa ............ H04W 48/08 370/329 |
| 2013/0308592 A1 | 11/2013 | Kitou et al. |
| 2014/0192638 A1* | 7/2014 | Taneja .............. H04W 28/0268 370/229 |
| 2015/0016330 A1* | 1/2015 | Schwartz ................ H04W 4/22 370/312 |

* cited by examiner

FIG. 8

| TERMINAL IDENTIFIER | DATA SIZE | TRANSMISSION PERIOD |
|---|---|---|
| DID#3 | 140 BYTES | 3s |

FIG. 9

| TERMINAL IDENTIFIER | DATA SIZE | TRANSMISSION PERIOD | OFFSET TIME |
|---|---|---|---|
| DID#1 | 45 BYTES | 1s | 0s |
| DID#2 | 60 BYTES | 2s | 1s |
| DID#3 | 140 BYTES | 3s | 0s |

WIRELESS COMMUNICATION SYSTEM, METHOD FOR WIRELESS COMMUNICATION, RELAY STATION, AND WIRELESS BASE STATION

CROSS-REFERENCE TO RELATED APPLICATION

This application is based upon and claims the benefit of priority of the prior Japanese Patent application No. 2014-011041, filed on Jan. 24, 2014, the entire contents of which are incorporated herein by reference.

FIELD

The embodiments discussed herein are a wireless communication system, a method for wireless communication, a relay station, and a wireless base station.

BACKGROUND

One of the known relay stations wirelessly transmits data received from multiple terminals to a wireless base station. In cases where the terminals are, for example, sensor devices that are not hold by users, the relay station is called a Machine-to-Machine GateWay (M2M GW). The wireless base station transmits the data received from the relay station to a server, which is connected to the wireless base station via a communication network. The server stores therein the data received from the wireless base station.

Each terminal detects a physical value each time a certain period elapses and transmits data representing the result of the detection to the relay station. Examples of the physical value are temperature, humidity, and a consumed amount of electricity. The data has a certain size. The transmission period and the size of data may be different with terminal. For example, one terminal transmits 40-byte data at a one-second period to the relay station while another terminal transmits 60-byte data at a two-second period. In this case, although each individual terminal transmits data of a constant size, the data size that multiple terminals transmit to the relay station fluctuates as the passage of time.

The following first through third wireless communication systems have been known (see, for example, Patent Literatures 1-3). In a first wireless communication system, the wireless base station notifies the relay station of setting information of logical paths that the relay station needs to communicate with the wireless base station and terminals. In a second wireless communication system, the relay station receives data destined for multiple terminals and mapping reference from the wireless base station. The relay station specifies a wireless resource between the relay station and each terminal on the basis of the mapping reference, and transmits data to each terminal using the specified wireless resource. In a third wireless communication system, a terminal transmits data to the wireless base station at a period that is determined on the basis of the state of a wireless channel of the terminal.

[Patent Literature 1] Japanese Laid-Open Patent Publication No. 2012-44336

[Patent Literature 2] Japanese National Publication No. 2010-532973

[Patent Literature 3] Japanese Laid-Open Patent Publication No. 2012-231263

SUMMARY

Unfortunately, the above Patent Literatures 1-3 do not consider the fluctuation in amount of data transmitted from the relay station to the wireless base station as the passage of time. This may hinder the wireless communication systems of Patent Literatures 1-3 from efficiently using the wireless resource between the relay station and the wireless base station.

As aspect of the embodiments, a wireless communication system includes: a wireless base station; and a relay station that receives data periodically transmitted from each of a plurality of terminals, and transmits the received data to the wireless base station.

The relay station transmits the data to the wireless base station in accordance with an allocation pattern of a wireless resource based on the size of the data and the period of the transmission for each of the plurality of terminals.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a table denoting an example of information included in terminal increase notification;

FIG. 9 is a table denoting an example of information included in pattern information;

DESCRIPTION OF EMBODIMENTS

Hereinafter, embodiments of the present disclosure will now be described with reference to the accompanying drawings. The following embodiments are exemplary, so there is no intention to exclude application of various modifications and techniques not suggested in the following description to the embodiments. Throughout accompanying drawings of the embodiments, like reference numbers designate the same or substantially identical parts and elements unless change and modification are otherwise specified.

First Embodiment

In an application complying with, for example, the Voice over Internet Protocol (VoIP), data having a certain size is transmitted at a certain period. The Long Term Evolution (LTE) standard defines Semi-Persistent Scheduling (SPS) that allocates a wireless resource having a certain amount to communication between a wireless base station and a terminal at a certain period. In uplink communication adopting the SPS, a terminal transmits data at a certain period using an allocated wireless resource.

This can reduce control messages used for allocation of a wireless resource as compared with cases where a wireless resource is allocated each time data is transmitted between a wireless base station and a terminal. Consequently, a wireless resources allocated to communication of control messages can also be reduced. With this advantage in view, it is proposed that SPS is applied to data to be transmitted from a relay station to a base station for each terminal.

Figure 1:
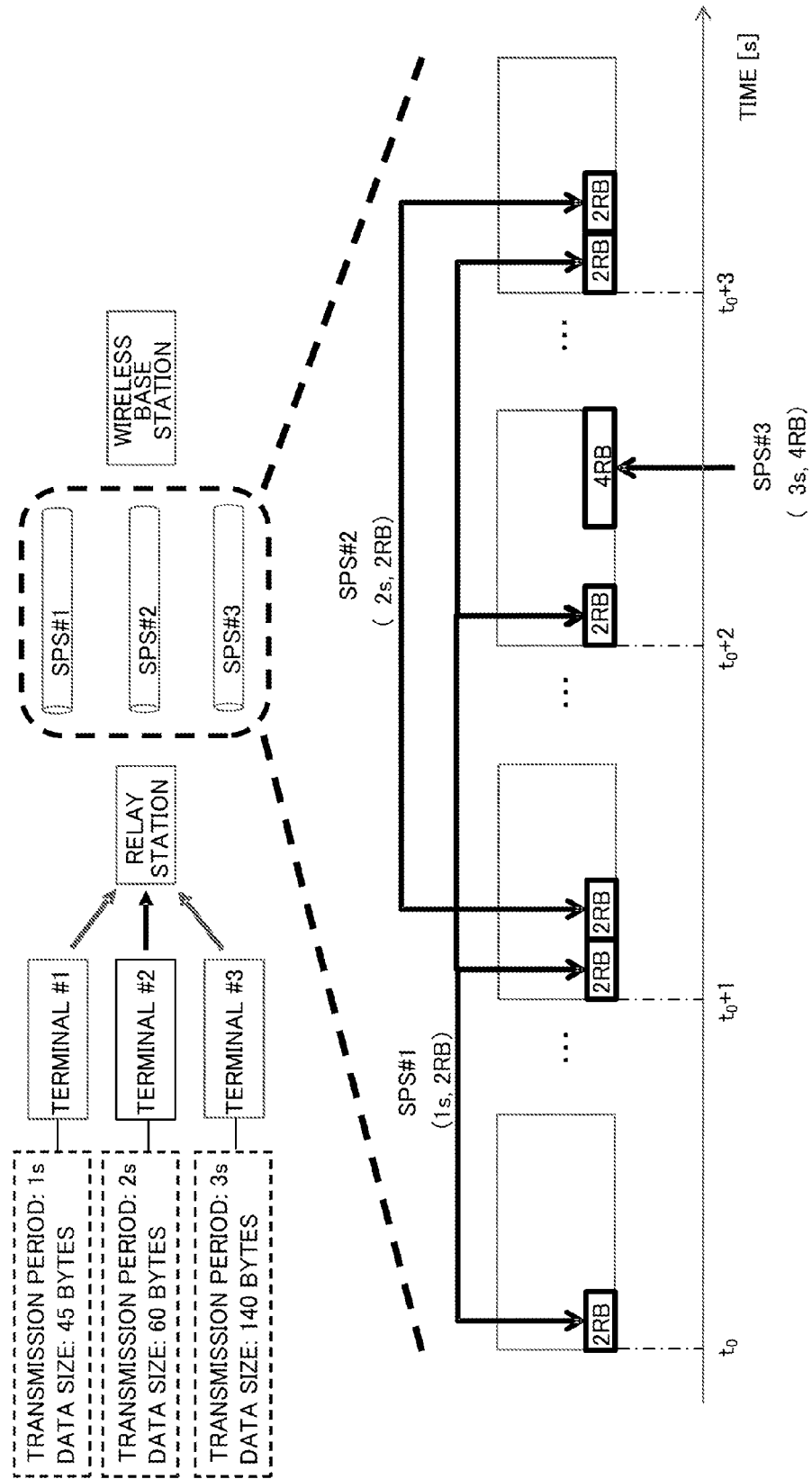
FIG. 1 is a diagram illustrating an example of wireless resources allocated to data transmission when a wireless resource is allocated to data transmitted from a relay station to a wireless base station for each terminal.

FIG. 1 is a diagram illustrating an example of a wireless resource allocated to data transmission from a relay station to a wireless base station when SPS is applied to each individual terminal. In this example, a relay station receives data different in size and transmission period from three terminals #1-#3, respectively.

The terminal #1 transmits 45-byte data at a transmission period of one second (1 [s]); the terminal #2 transmits 60-byte data at a transmission period of two seconds (2 [s]); and the terminal #3 transmits 140-byte data at a transmission period of three seconds (3 [s]).

In this example, the wireless base station allocates wireless resources to data transmission of the terminals #1-#3 through SPS #1-#3, respectively. In this example, the data size that a single Resource Block (RB) can carry is 42 bytes. A RB is a unit that a wireless resource can be allocated.

Accordingly, the terminals #1-#3 use two RBs, two RBs, and four RBs, respectively, each time the terminals transmit data. Since the terminals have different transmission periods, the number of RBs used for data transmission from the relay station to the wireless base station fluctuates as the passage of time. In this example, as illustrated in FIG. 1, the number of RBs used for data transmission from the relay station to the wireless base station at the time points $t_0$ [s], $t_0+1$ [s], $t_0+2$ [s], and $t_0+3$ [s] are two, four, six, and four, respectively.

As described above, the data size that a single Resource Block (RB) can carry is 42 bytes in this example. The data size of the terminal #1 is 45 bytes, which means that among two RBs that the SPS#1 allocates to the data transmission of the terminal #1, 37 (=2×42-45) bytes are not used in the data transmission. The unused portion is, for example, padded with a certain value.

When SPS is applied to each individual terminal in data transmission from the relay station to the wireless base station, a wireless resource allocated to the data transmission from the relay station to the wireless base station easily have such an unused portion.

In order deal with the above, in the wireless communication system according to the first embodiment, the relay station transmits data to the wireless base station in accordance with an allocation pattern of a wireless resource conforming to the data size and the transmission period of each terminal, which will be detailed below.

This can reduce control messages used for allocation of a wireless resource as compared with cases where a wireless resource is allocated to data transmission from the relay station to the wireless base station for each terminal by means of, for example, SPS. Consequently, the wireless resource allocated to communication of control messages can be reduced, so that a wireless resource between the relay station and the wireless base station can be efficiently used.

As to be detailed below, the wireless resource allocated to data transmission from the relay station to the wireless base station in the wireless communication system according to the first embodiment is an element of the wireless communication band identified by time and frequency. The element has successive time and successive frequency in the wireless communication band. A wireless communication band represents a communication region of a radio wave.

This makes the relay station possible to collectively transmit data from multiple terminals in a lump using a wireless resource allocated in accordance with an allocation pattern. This reduces an unused wireless resource, which is not used in data transmission, as compared with cases where wireless resources are allocated to data transmission from the relay station to the wireless base station for each terminal.

The relay station and the wireless base station wirelessly communicate with each other. In wireless communication, a Modulation and Coding Scheme (MCS) used for data transmission from the relay station to the wireless base station may be changed with fluctuation in communication quality.

For example, when the communication quality declines, the MCS may be changed from 16QAM(½) to QPSK(½). The 16QAM(½) represents an MCS having a coding rate is ½ and a modulation scheme of 16QAM while the QPSK(½) represents an MCS having a coding rate is ½ and a modulation scheme of QPSK. The term QAM is the abbreviation for Quadrature Amplitude Modulation; and the term QPSK is the abbreviation for Quadrature Phase Shift Keying.

When the MCS is changed, the data size that a single RB can carry also changes. When the MCS is changed from 16QAM(½) to QPSK(½), the data size that a single RB can carry is reduced to ½ of the data size of 16QAM(½).

When the MCS is changed from 16QAM(½) to QPSK(½) in the example of FIG. 1, the number of RBs that the terminals #1-#3 use each time the terminals transmit data are changed to three, three, and seven, respectively. Accordingly, when the MCS is changed under the state where a wireless resource is allocated to the data transmission from the relay station to the wireless base station for each terminal by means of, for example, SPS there is a possibility that the relay station is incapable of transmitting data from each terminal unless the wireless resource is re-allocated.

Accordingly, load on reallocation of a wireless resource increases as the number of terminals increases. Likewise, the control messages used for allocation of a wireless resource increase as the number of terminals increases.

An increase in the number of terminals makes it difficult to allocate a wireless resource to each individual terminal, avoiding the overlap of the wireless resources allocated to different terminals.

In contrast, as to be detailed below, the relay station of the first embodiment determines a wireless resources allocated to data transmission from the relay station to the wireless bas station on the basis of the MCS used for the data transmission and a data size pattern. The data size pattern is a size pattern of data to be transmitted from the relay station to the wireless base station.

This can reflect the change in MCS used in data transmission from the relay station to the wireless base station in the allocation pattern so that the allocation pattern can be appropriately determined. Consequently, even when the MCS is changed, the data can be correctly transmitted from the relay station to the wireless base station without re-allocation of a wireless resource.

As to be detailed below, the relay station and the wireless base station of the first embodiment share the data size pattern beforehand. With this configuration, when the wireless base station changes the MCS, the wireless base station notifies the new MCS to the relay station, and the relay station and the wireless base station can determine an appropriate allocation pattern.

This can reduce the frequency of allocation of a wireless resource as compared with, for example, cases where a wireless resource is allocated to data transmission from the relay station to the wireless base station for each terminal by means of, for example, SPS. Furthermore, the control messages used for allocation of a wireless resource can also be reduced as compared with, for example, cases where a wireless resource is allocated data transmission from the relay station to the wireless base station for each terminal by means of, for example, SPS. Consequently, the wireless resource allocated to communication of control messages can be reduced.

The above configuration allows the wireless resource between the relay station and the wireless base station to be efficiently used.

Hereinafter, the wireless communication system according to the first embodiment will now be detailed.

(Configuration)

Figure 2:
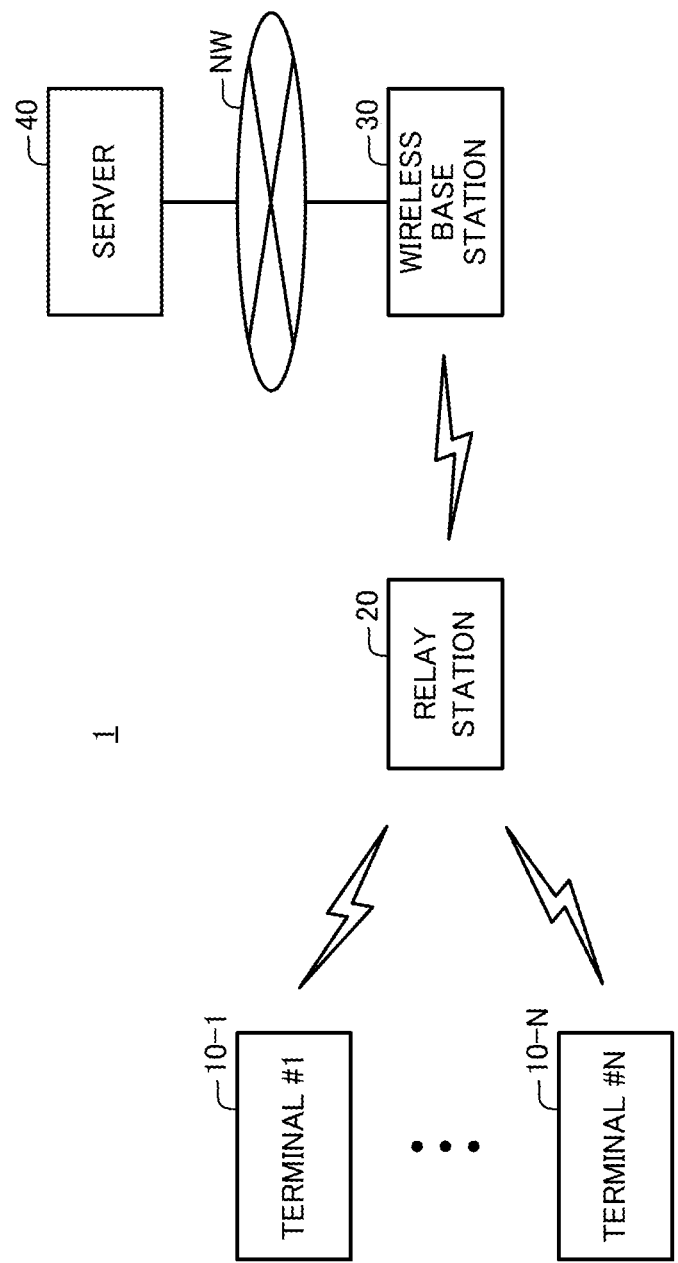
FIG. 2 is a block diagram schematically illustrating an example of the configuration of a wireless communication system according to a first embodiment.

As illustrated in FIG. 2, the wireless communication system 1 of the first embodiment includes N terminals 10-1, . . . , 10-N, a relay station 20, a wireless base station 30, and a server 40. The number N represents an integer equal to or more than two. Hereinafter, when a terminal 10-$i$ does not have to be discriminated from other terminals, the terminal 10-$i$ is also referred to as terminal 10. The number $i$ represents an integer of 1 through N.

In this example, the terminal 10-$i$ is a sensor device having a wireless communication function. The terminal 10-$i$ measures a physical value each time a certain measurement period elapses. Examples of the physical value are temperature, humidity, acceleration, illumination, wind direction, wind speed, earthquake motion, rainfall amount, sound magnitude, water level, and used amount of electricity, water, or gas.

The terminal 10-$i$ transmits sensor data representing the measured physical value to the relay station 20 in accordance with the first wireless communication scheme each time a certain transmission period elapses. In this example, the measurement period has the same time length as the transmission period, but alternatively may be different from the transmission period. The first wireless communication scheme of the first embodiment is the wireless Local Area Network (LAN) scheme, but may alternatively be Bluetooth® or ZigBee®.

In the first embodiment, the N terminals 10-1, . . . , 10-N and the relay station 20 form a Wireless Sensor Network (WSN). Alternatively, the N terminals 10-1, . . . , 10-N and the relay station 20 may form a wireless ad-hoc network, which allows the N terminals 10-1, . . . , 10-N to carry out multi-hop communication.

The terminal 10-$i$ may communicate with the relay station 20 via a wire instead of the wireless scheme. Alternatively, the terminal 10-$i$ may be called a wireless terminal or a terminal device. Further alternatively, the terminal 10-$i$ may be a mobile station or a User Equipment (UE).

The relay station 20 communicates with the wireless base station 30 in accordance with a second wireless communication scheme. The second wireless communication scheme of the first embodiment is the LTE scheme, but may alternatively be the LTE-Advanced or the Worldwide Interoperability for Microwave Access (WiMAX).

The relay station 20 receives sensor data from the respective terminals 10-$i$ and transmits the received sensor data to the server 40 via the wireless base station 30.

In the first embodiment, the relay station 20 is an M2M GW. Alternatively, the relay station 20 may be a GW communicable with a terminal hold by a user. An example of the wireless base station 30 is an Evolved Node B (eNB). Alternatively, the wireless base station 30 may be an access point, a Node B (NB), a femto base station, a macro base station, or a home base station.

The server 40 is connected to the wireless base station 30 via a communication network NW. In the first embodiment, the server 40 communicates with the wireless base station 30 via a wire. Alternatively, the server 40 may wirelessly communicate with the wireless base station 30 instead of the wire.

In the first embodiment, the communication network NW complies with the Internet Protocol (IP). The server 40 receives sensor data from the wireless base station 30 and stores the received sensor data into a storage device.

A portion of the wireless communication system 1 including devices closer to the communication network NW (in other words, the portion having an upper level) than the wireless base station 30 may called an EPC, which is the abbreviation for Evolved Packet Core. A portion of the wireless communication system 1 formed by the wireless base station 30 may called an E-UTRAN, which is the abbreviation for Evolved Universal Terrestrial Radio Access Network.

(Configuration: Terminal)

Figure 3:
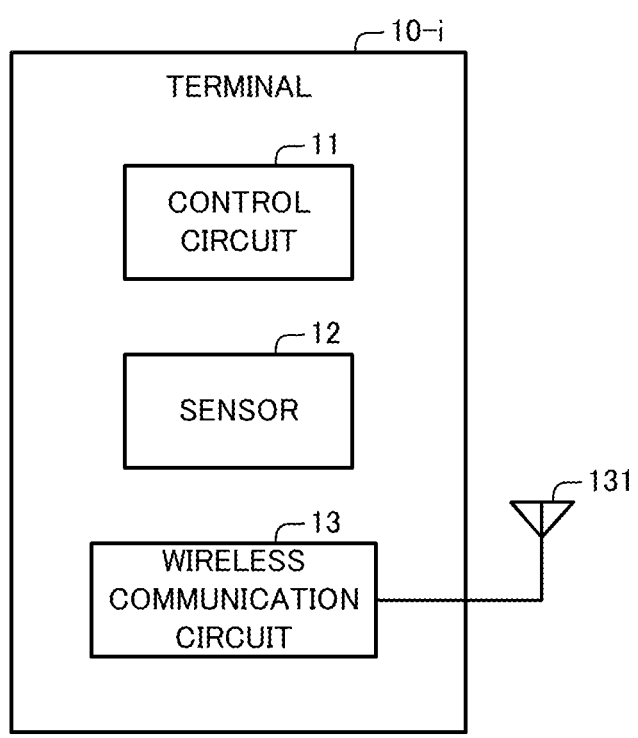
FIG. 3 is a block diagram schematically illustrating an example of the configuration of the terminal of FIG. 2.

As illustrated in FIG. 3, the terminal 10-$i$ exemplarily includes a control circuit 11, a sensor 12, and a wireless communication circuit 13.

The control circuit 11 controls the sensor 12 and the wireless communication circuit 13. The functions of the control circuit 11 will be detailed below.

The sensor 12 measures a physical value each time a certain measurement period elapses. Examples of the physical value are temperature, humidity, acceleration, illumination, wind direction, wind speed, earthquake motion, rainfall amount, sound magnitude, water level, and used amount of electricity, water, or gas.

The wireless communication circuit 13 includes an antenna 131. The wireless communication circuit 13 modulates and codes (in other words, encodes) data (e.g., a control message and sensor data to be detailed below) input from the control circuit 11 in conformity to the first wireless communication scheme. Furthermore, the wireless communication circuit 13 performs DA conversion, and frequency conversion (here, up-conversion) on a modulated signal after undergoing the modulating and coding. The term DA is an abbreviation for Digital to Analog. The wireless communication circuit 13 transmits a wireless signal after undergoing the frequency conversion through the antenna 131.

The wireless communication circuit 13 receives a wireless signal through the antenna 131. The wireless communication circuit 13 performs frequency conversion (here, down-conversion) and AD conversion on the received wireless signal. The term AD is the abbreviation for Analog to Digital. The wireless communication circuit 13 demodulates and decodes the modulated signal after undergoing the AD conversion in conformity to the first wireless communication scheme. The wireless communication circuit 13 outputs the decoded data to the control circuit 11.

Figure 4:
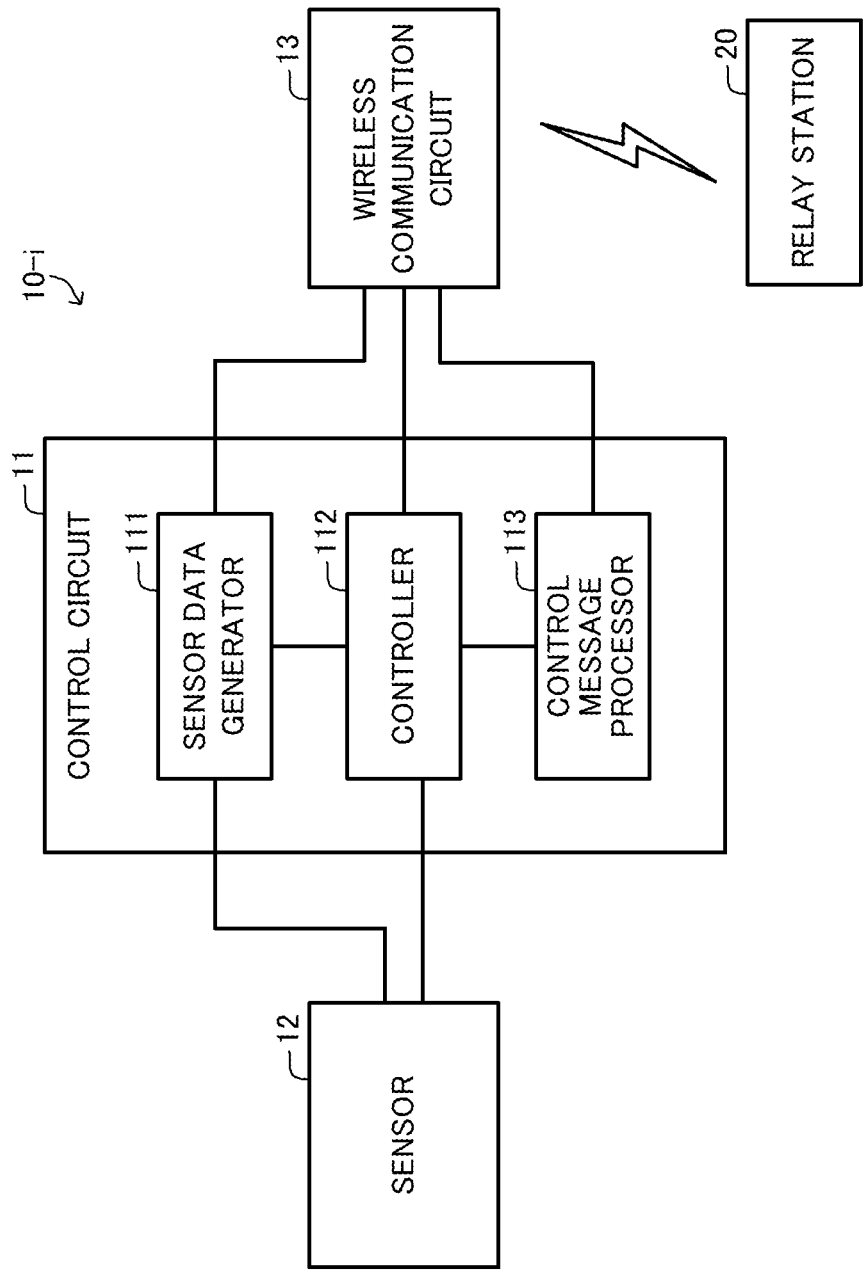
FIG. 4 is a block diagram schematically illustrating an example of the function of a control circuit included in the terminal of FIG. 3.

As exemplarily illustrated in FIG. 4, the control circuit 11 of the terminal 10-$i$ has the functions of a sensor data generator 111, a controller 112, and a control message processor 113.

The sensor data generator 111 generates sensor data representing the physical value measured by the sensor 12. In the first embodiment, the sensor data having a size predetermined on the basis of the type of physical value. The sensor data of the first embodiment includes a terminal identifier that identifies the terminal 10-$i$.

In the first embodiment, the size of the sensor data is different with each type of physical value to be measured, and the period, at which the sensor data is transmitted, is different with each type of physical value to be measured. Alternatively, the sensor data of different types of physical value to be measured may have the same size and may be transmitted at the same period.

The control message processor 113 obtains a control message conforming to the first wireless communication scheme from the data received from the relay station 20.

The controller 112 controls the wireless communication circuit 13 on the basis of the control message obtained by the control message processor 113. For example, the controller 112 controls, for example, data retransmission, the modulating and coding scheme, a transmission electric power, and a communication timing. The controller 112 controls the wireless control circuit 13 such that the sensor data generated by the sensor data generator 111 is transmitted to the relay station 20 each time the certain transmission period elapses. In addition, the controller 112 generates a control message conforming to the first wireless communication scheme and controls the wireless communication circuit 13 to transmit the generated control message to the relay station 20.

The functions of the terminal 10-$i$ may be achieved with a Large Scale Integration (LSI). At least part of the functions of the terminal 10-$i$ may be achieved with a programmable logic circuit such as a Programmable Logic Device (PLD) or a Field-Programmable Gate Array (FPGA).

The terminal 10-$i$ may include a processing device, such as a CPU or a DSP, and a storage device, and may exert at least part of the functions of the terminal 10-$i$ by the processing device executing a program stored in the storage device. The terms CPU and DSP are abbreviations for a Central Processing Unit and a Digital Signal Processor, respectively.

(Configuration: Relay Station)

Figure 5:
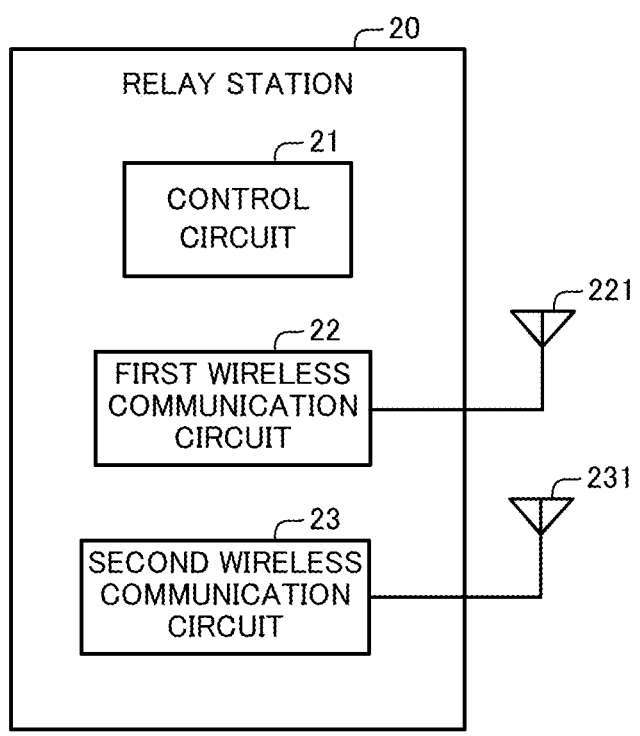
FIG. 5 is a block diagram schematically illustrating an example of the configuration of the relay station of FIG. 2.

As illustrated in FIG. 5, the relay station 20 exemplarily includes a control circuit 21, a first wireless communication circuit 22, and a second wireless communication circuit 23.

The control circuit 21 controls the first wireless communication circuit 22 and the second wireless communication circuit 23. The functions of the control circuit 21 will be detailed below.

The first wireless communication circuit 22 includes an antenna 221. The first wireless communication circuit 22 modulates and codes data input from the control circuit 21 in conformity to the first wireless communication scheme. The first wireless communication circuit 22 further performs DA conversion, and frequency conversion (here, up-conversion) on a modulated signal after undergoing the modulating and coding. The first wireless communication circuit 22 transmits a wireless signal after undergoing the frequency conversion through the antenna 221.

The first wireless communication circuit 22 receives a wireless signal via the antenna 221. The first wireless communication circuit 22 performs frequency conversion (here, down-conversion) and AD conversion on the received wireless signal. The first wireless communication circuit 22 demodulates and decodes the modulated signal after undergoing the AD conversion in conformity to the first wireless communication scheme. The first wireless communication circuit 22 outputs the decoded data to the control circuit 21.

The second wireless communication circuit 23 includes an antenna 231. The second wireless communication circuit 23 has the same function as the first wireless communication circuit 22 except for the point that the second wireless communication circuit 23 uses the second wireless communication scheme instead of the first wireless communication scheme.

Figure 6:
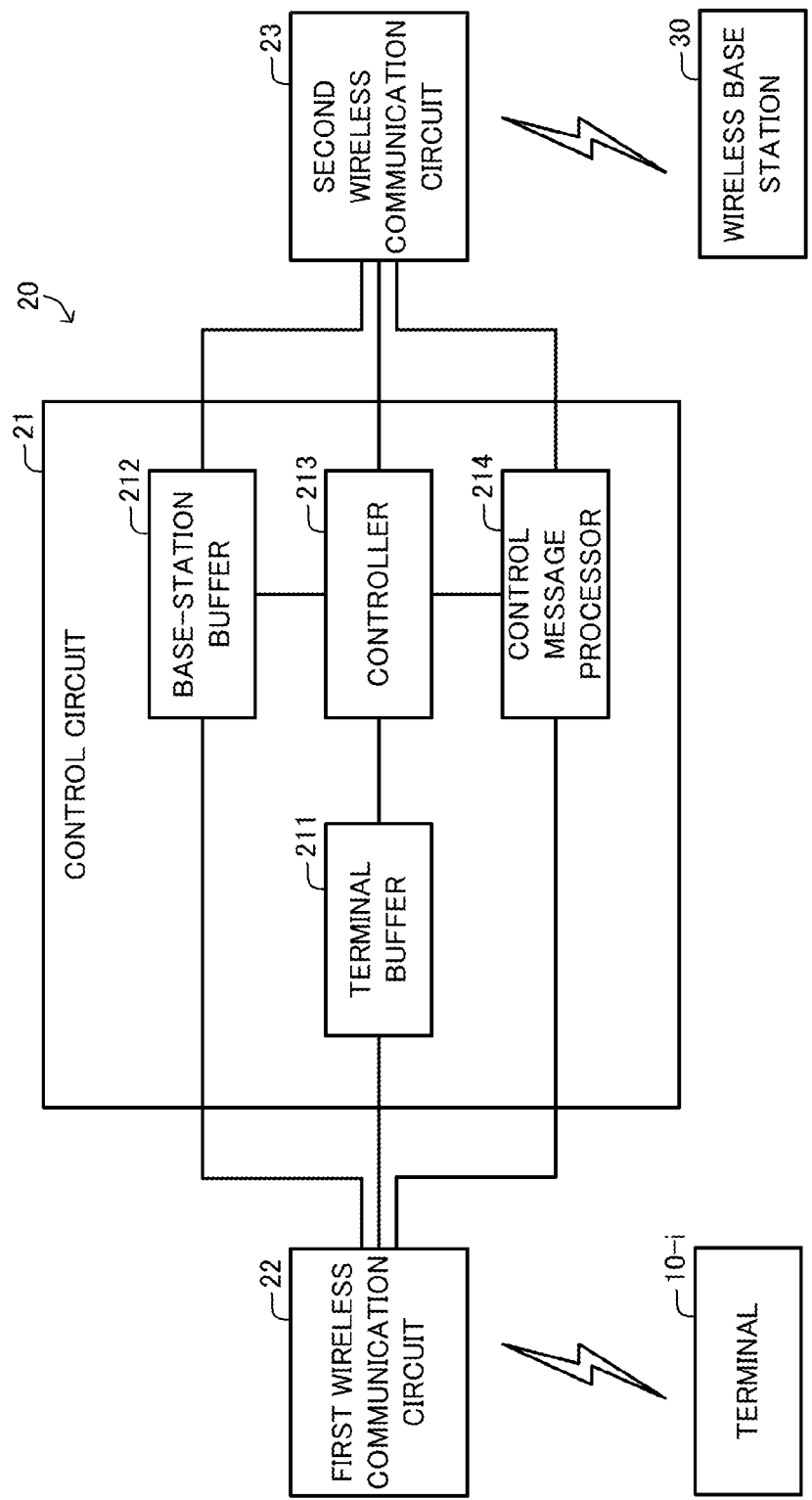
FIG. 6 is a block diagram schematically illustrating an example of the function of a control circuit included in the relay station of FIG. 5.

As illustrated in FIG. 6, the control circuit 21 of the relay station 20 includes the functions of a terminal buffer 211, a base-station buffer 212, a controller 213, and a control message processor 214.

The controller 213 stores the sensor data received from the multiple terminals 10-1, . . . , 10-N into the base-station buffer 212.

The control message processor 214 obtains a control message conforming to the first wireless communication scheme from the data received from the terminal 10-$i$, and also obtains a control message conforming to the second wireless communication scheme from the data received from the wireless base station 30.

The controller 213 controls the first wireless communication circuit 22 and the second wireless communication circuit 23 on the basis of control messages conforming to the first wireless communication scheme and the second wireless communication scheme, respectively. For example, the controller 213 controls data retransmission, a modulating and coding scheme, transmission electric power, and a communication timing.

Furthermore, the controller 213 generates a control message conforming to the first wireless communication scheme and stores the generated control message into the terminal buffer 211. In addition, the controller 213 controls the first wireless communication circuit 22 to transmit the control message stored in the terminal buffer 211 to the terminal 10-$i$ at a certain timing.

Similarly, the controller 213 generates a control message conforming to the second wireless communication scheme and stores the generated control message into the base-station buffer 212. In addition, the controller 213 controls the second wireless communication circuit 23 to transmit the control message stored in the base-station buffer 212 to the wireless base station 30 at a certain timing.

Furthermore, a control message communicated between the relay station 20 and the wireless base station 30 of the first embodiment includes an allocation request, allocation information, terminal increase notification, terminal decrease notification, pattern information, and MCS information. Hereinafter, these pieces of information will now be detailed.

First of all, relay data, a relay period, processing reference timing, allocation reference timing, and allocation reference frequency will now be detailed.

The relay data is data transmitted from the relay station 20 to the wireless base station 30. The relay data includes sensor data transmitted from the multiple terminals 10-1, . . . , 10-N and received by the relay station 20.

The relay period is a time interval at which the relay data is transmitted from the relay station 20 to the wireless base station 30. In the first embodiment, the relay period is assumed to be one second (1 [s]). In the first embodiment, the relay period may be retained in the wireless base station 30 beforehand and may be notified from the wireless base station 30 to the relay station 20. Alternatively, the relay period may be retained in the relay station 20 beforehand and may be notified from the relay station 20 to the wireless base station 30. Further alternatively, the relay period may be retained in both the relay station 20 and the wireless base station 30, beforehand. The relay period may be determined on the basis of the minimum value of the transmission periods at which the sensor data is transmitted from the respective terminals 10-1, . . . , 10-N.

The processing reference timing is the reference timing at which the relay station 20 starts transmission of the relay data to the wireless base station 30. In the first embodiment, the processing reference timing may be retained in the wireless base station 30 beforehand, and may be notified from the wireless base station 30 to the relay station 20. Alternatively, the processing reference timing may be retained in the relay station 20 beforehand, and may be notified from the relay station 20 to the wireless base station 30, or may be retained in both the relay station 20 and the wireless base station 30 beforehand.

The allocation reference timing is a reference timing with which RB is identified on the basis of the allocation information. In the first embodiment, the allocation reference timing corresponds to each timing that L times the relay period elapses from the processing reference timing. Here, the number L represents an integer equal to or more than zero. For example, the allocation reference timing may be the leading timing of the wireless frame in the time direction.

The allocation reference frequency is a reference frequency to identify an RB based on the allocation information. In the first embodiment, the allocation reference frequency may be the minimum value, the maximum value, or the center value of the system band.

The allocation request is information to request allocation of a reference time and a reference bandwidth. In the first embodiment, the allocation request is transmitted from the relay station 20 to the wireless base station 30 as to be detailed below.

The reference time is a time between a reference timing of the wireless resource allocated to transmission of the relay data from the relay station 20 to the wireless base station 30 and the allocation reference timing. In the first embodiment, the time point (in other words, timing) at which the reference time elapses from the allocation reference timing corresponds to the reference timing of a wireless resource allocated to the transmission of the relay data. The wireless resource of the first embodiment is an element, which is identified by time and frequency, of the wireless communication band.

In the first embodiment, the information representing the reference time represents the number of RBs in the time direction. The information representing the reference time may represent a time (e.g., 50 [ms]).

The reference bandwidth is a bandwidth between a reference frequency of the wireless resource allocated to the transmission of the relay data from the relay station 20 to the wireless base station 30 and the allocation reference frequency. In the first embodiment, a frequency lower by the reference bandwidth than the allocation reference frequency is a reference frequency of the wireless resource allocated to the transmission of the relay data.

In the first embodiment, information representing the reference bandwidth represents the number of RBs in the frequency direction. The information representing the reference bandwidth may be a bandwidth (e.g., 900 [kHz]).

The allocation information is information representing the reference time and the reference bandwidth. In the first embodiment, the allocation information is transmitted from the wireless base station 30 to the relay station 20, as to be detailed below.

Figure 7:
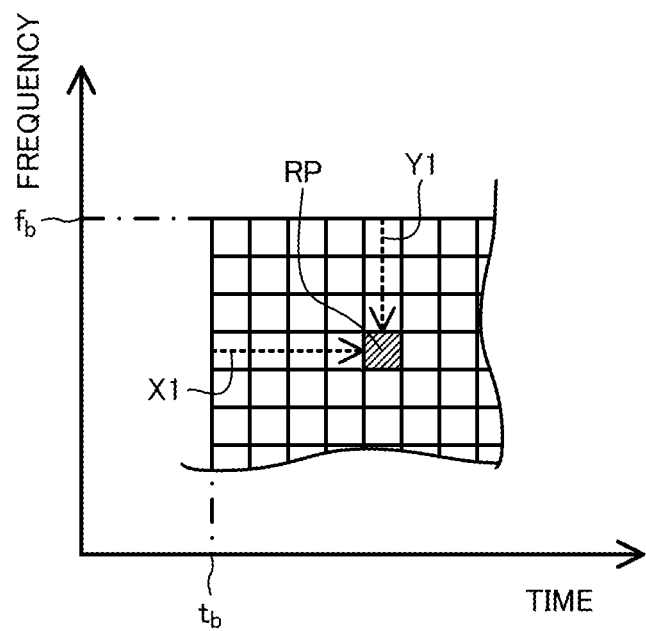
FIG. 7 is a diagram illustrating examples of an allocation reference timing and an allocation reference frequency represented by allocation information.

As illustrated in FIG. 7, the allocation reference timing, the allocation reference frequency, and the allocation information of the first embodiment identify a single resource block RP that is the reference of the wireless resource allocated to the transmission of the relay data. FIG. 7 illustrates an example in which the number X1 of RBs in the time direction represented by the reference time is four and the number Y1 of RBs in the frequency direction represented by the reference bandwidth is three. In FIG. 7, the symbol $t_b$ represents the allocation reference timing while the symbol $f_b$ represents an allocation reference frequency. As to be detailed below, the wireless resource to be allocated to the transmission of the relay data in the first embodiment includes the resource block RP and one or more resource blocks successive in the time direction to the resource block RP.

The terminal increase notification is information representing an increase in the number of terminals 10 that transmit sensor data to the relay station 20. In the first embodiment, the terminal increase notification is transmitted from the relay station 20 to the wireless base station 30, as to be detailed below. As illustrated in FIG. 8, the terminal increase notification includes the terminal identifier, the size of sensor data, and the transmission period of sensor data of each terminal 10 that is the basis of the increase.

In contrast, the terminal decrease notification is information representing a decrease in the number of the terminals 10 that transmit sensor data to the relay station 20. In the first embodiment, the terminal decrease notification is transmitted from the relay station 20 to the wireless base station 30, as to be detailed below. The terminal decrease information of the first embodiment includes the terminal identifier of each terminal 10 that is the basis of the decrease.

The pattern information is information of the basis of the data-size pattern, which corresponds to the pattern of the size of the relay data to be transmitted from the relay station 20 to the wireless base station 30. The data-size pattern of the first embodiment indicates the fluctuation in size of the relay data as the passage of time.

As denoted in FIG. 9, the pattern information of the first embodiment includes the terminal identifier, the size of sensor data, the transmission period of sensor data, and an offset time of each of the terminals 10-1, ..., 10-N.

The offset time is a time between a timing of transmitting the relay data including sensor data from the relay station 20 to the wireless base station 30 and the processing reference timing described above.

In the first embodiment, the pattern information is transmitted from the wireless base station 30 to the relay station 20, as to be detailed below.

The MCS information represents the MCS. The MCS information of the first embodiment is the number to identify the MCS, and may be referred to as, for example, an MCS index. As to be detailed below, the MCS information is transmitted from the wireless base station 30 to the relay station 20 in the first embodiment.

The combination of the pattern information, the reference time, and the reference bandwidth is an example of information of the basis to determine the allocation pattern of the wireless resources in accordance with the size of sensor data and the transmission period of each terminal 10.

The controller 213 obtains the size of the relay data to be transmitted in wireless frames to which the wireless resource is to be allocated based on the pattern information received from the wireless base station 30. The controller 213 determines the number of RBs to be used for the transmission of the relay data from the relay station 20 to the wireless base station 30 on the basis of the obtained size of the relay data and the MCS information received from the wireless base station 30.

The controller 213 determines the wireless resource to be allocated to the transmission of the relay data from the relay station 20 to the wireless base station 30 on the basis of the allocation information received from the wireless base station 30 and the determined number of RBs. In the above manner, the controller 213 determines the wireless resource to be allocated to the transmission of the relay data on the basis of the MCS represented by the MCS information and the data-size pattern represented by the pattern information.

In the first embodiment, a portion having a successive time and a successive frequency of the wireless communication band is allocated to the transmission of the relay data from the relay station 20 to the wireless base station 30. In the first embodiment, the RBs successive in the time direction are allocated to the transmission of the relay data. Alternatively, the RBs successive in the frequency direction may be allocated to the transmission of the relay data. In this case, the wireless resource allocated to the transmission of the relay data may have multiple RBs in the frequency direction.

The controller 213 generates the relay data from the sensor data stored in the base-station buffer 212 on the basis of the pattern information received from the wireless base station 30. The controller 213 controls the second wireless communication circuit 23 to transmit the generated relay data to the wireless base station 30 using the determined wireless resource.

In the first embodiment, the relay data is a single data unit, which may be referred to as a protocol data unit. An example of the data unit is a packet.

In the first embodiment, the sequence of the sensor data to be included in the relay data is determined on the basis of the pattern information. In the first embodiment, sensor data associated with a terminal identifier arranged closer to the leading end in the pattern information is arranged closer to the leading end in the relay data.

Figure 10:
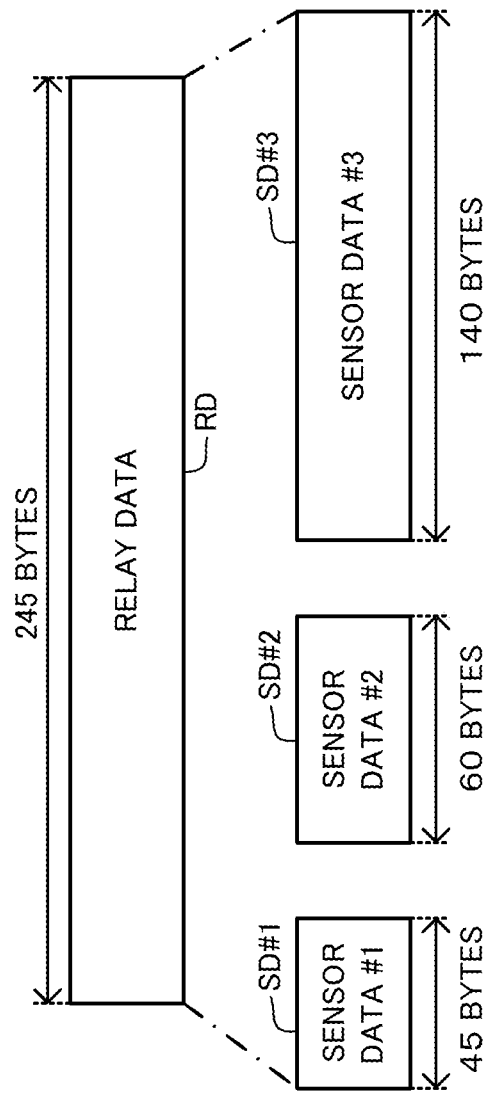
FIG. 10 is a diagram illustrating an example of sensor data included in relay data.

Considering the above, under a state where the pattern information of FIG. 9 is shared by the relay station 20 and the wireless base station 30, it is assumed that the relay data RD includes sensor data SD#1-SD#3 associated with the terminal identifiers DID#1-DID#3, respectively, as depicted in FIG. 10. In this case, in the relay data, the sensor data SD#1 is arranged at the leading position; the sensor data SD#2 is arranged subsequently to the sensor data SD#1; and the sensor data SD#3 is arranged subsequently to the sensor data SD#2. In other words, the relay data has an arrangement of, in sequence from the leading position, the sensor data SD#1, the sensor data SD#2, and the sensor data SD#3.

Furthermore, under a state where the pattern information of FIG. 9 is shared by the relay station 20 and the wireless base station 30, it is assumed that the relay data RD includes sensor data SD#1 and SD#3 associated with the terminal identifiers DID#1 and DID#3, respectively. In this case, in the relay data, the sensor data SD#1 is arranged at the leading position; and the sensor data SD#3 is arranged subsequently to the sensor data SD#1. In other words, the relay data has an arrangement of, in sequence from the leading position, the sensor data SD#1, and the sensor data SD#3.

(Configuration: Wireless Base Station)

Figure 11:
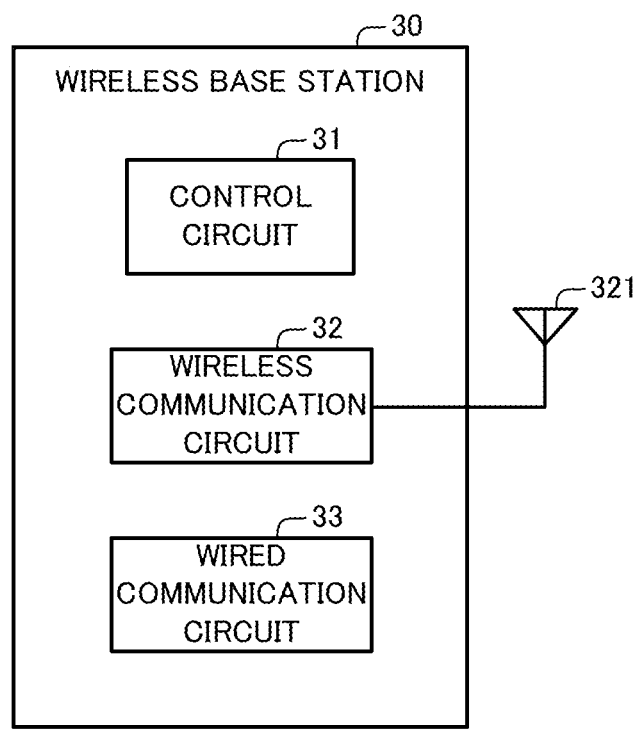
FIG. 11 is a block diagram schematically illustrating an example of the configuration of the wireless base station of FIG. 2.

As illustrated in FIG. 11, the wireless base station 30 exemplarily includes a control circuit 31, a wireless communication circuit 32, and a wired communication circuit 33.

The control circuit 31 controls the wireless communication circuit 32 and the wired communication circuit 33. The functions of the control circuit 31 will be detailed below.

The wireless communication circuit 32 includes an antenna 321. The wireless communication circuit 32 modulates and codes data input from the control circuit 31 in accordance with the second wireless communication scheme. Furthermore, the wireless communication circuit 32 performs DA conversion and frequency conversion (here, up-conversion) on the modulated signal after undergoing the modulating and the coding. The wireless communication circuit 32 transmits a wireless signal after undergoing the frequency conversion through the antenna 321.

The wireless communication circuit 32 receives a wireless signal through the antenna 321. The wireless communication circuit 32 performs the frequency conversion (here, down-conversion) and AD conversion on the received wireless signal. The wireless communication circuit 32 demodulates and decodes the modulated signal after undergoing the AD conversion in accordance with the second wireless communication scheme. The wireless communication circuit 32 outputs the data after undergoing the decoding to the control circuit 31.

The wired communication circuit 33 transmits data input from the control circuit 31 to the server 40 through a communication cable, and outputs data received from the server 40 through the communication cable to the control circuit 31.

Figure 12:
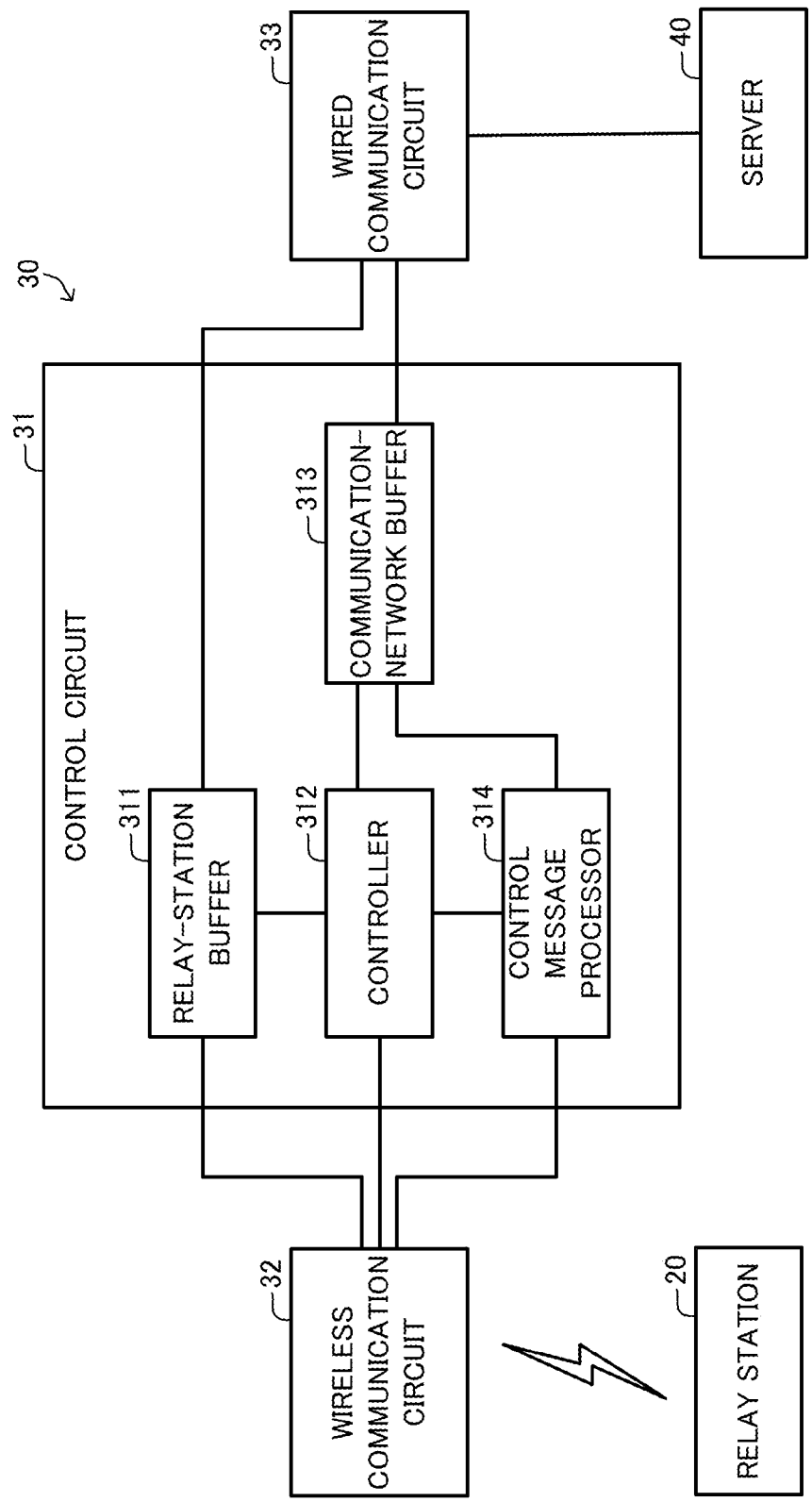
FIG. 12 is a block diagram schematically illustrating an example of the function of a control circuit included in the wireless base station of FIG. 11.

As illustrated in FIG. 12, the control circuit 31 of the wireless base station 30 includes the functions of a relay-station buffer 311, a controller 312, a communication-network buffer 313, and a control message processor 314.

The control message processor 314 obtains a control message conforming to the second wireless communication scheme from data received from the relay station 20.

The controller 312 controls the wireless communication circuit 32 based on the control message that is obtained by the control message processor 314 and that conforms to the second wireless communication scheme. The controller 312 controls, for example, data retransmission, a MCS, transmission electric power, and a communication timing.

Furthermore, the controller 312 generates a control message conforming to the second wireless communication scheme and stores the generated control message into the relay-station buffer 311. In addition, the controller 312 controls the wireless communication circuit 32 to transmit the control message retained in the relay-station buffer 311 to the relay station 20 at a certain transmission timing.

Upon receipt of the allocation request from the relay station 20, the controller 312 determines a reference time and a reference bandwidth. The controller 312 controls the wireless communication circuit 32 to transmit the allocation information representing the determined reference time and the determined reference bandwidth to the relay station 20. For example, the controller 312 may determine the reference time and reference bandwidth in accordance with a certain algorithm.

Upon receipt of the terminal increase notification from the relay station 20, the controller 312 determines the offset time. In the first embodiment, the controller 312 calculates the value M (in this example, 3) by dividing the transmission period (for example, 3 [s]) included in the terminal increase notification by the relay period (in this example, 1 [s]). In this case, the controller 312 selects one from the integers of 0 through M−1 using a pseudo random number and determines the product of the selected integer and the relay period to be the offset time.

To determine the offset time for each terminal identifier included in the terminal increase notification is an example of determination of the offset time for each terminal 10. The controller 312 may determine the offset time in accordance with a certain algorithm instead of using a pseudo random number.

In cases where the controller 312 already retains the pattern information, the controller 312 adds the terminal identifier, the size of sensor data and the transmission period of sensor data that are included in the terminal increase notification, and the determined offset time into the retained pattern information. In contrast, in cases where the controller 312 does not retain the pattern information, the controller 312 newly retains the pattern information including the terminal identifier, the size of sensor data and the transmission period of sensor data that are included in the terminal increase notification, and the determined offset time.

Upon receipt of the terminal decrease notification from the relay station 20, the controller 312 deletes the terminal identifier, the size of sensor data, the transmission period of sensor data, and the offset time associated with a terminal identifier included in the terminal decrease notification from the retained pattern information.

To update the pattern information on the basis of the terminal increase notification or the terminal decrease notification is an example of, in the event of change in the number of terminals 10 that transmit sensor data to the relay station 20, updating the allocation pattern in accordance with the change.

Upon receipt of the terminal increase notification or the terminal decrease notification from the relay station 20, the controller 312 controls the wireless communication circuit 32 to transmit the retained pattern information to the relay station 20.

To transmit the pattern information, the reference time, and the reference bandwidth from the wireless base station 30 to the relay station 20 is an example of sharing the allocation pattern between the relay station 20 and the wireless base station 30.

The controller 312 determines the MCS to be used for communication with the relay station 20 on the basis of information representing the communication quality between the relay station 20 and the wireless base station 30. An example of the information representing the communication quality is a Channel Quality Indicator (CQI).

Alternative examples of the information representing communication quality may be Reference Signal Received Power (RSRP); Signal to Interference plus Noise Ratio (SINR); and Reference Signal Received Quality (RSRQ).

When the MCS used for transmitting the relay data from the relay station 20 to the wireless base station 30 is changed, the controller 312 controls the wireless communication circuit 32 to transmit the MCS information representing the MCS after the change to the relay station 20.

Likewise the controller 213, the controller 312 determines a wireless resource to be allocated to reception of the relay data from the relay station 20 at the wireless base station 30 on the basis of the pattern information, the allocation information, and the MCS information. The controller 312 controls the wireless communication circuit 32 to receive the relay data from the relay station 20, using the determined wireless resource.

The controller 312 obtains the sensor data of each terminal 10 from the relay data received from the relay station 20 on the basis of the pattern information. In the first embodiment, the controller 312 identifies the sequence of the sensor data contained in the relay data on the basis of the pattern information and obtains the sensor data of each terminal 10 on the basis of the identified sequence and the data sizes included in the pattern information.

Accordingly, in cases where the pattern information of FIG. 9 is shared between the relay station 20 and the wireless base station 30, it is assumed that the relay data RD includes the sensor data SD#1-SD#3 associated with the respective terminal identifiers DID#1-DID#3, as illustrated in FIG. 10. In this case, the controller 312 obtains the 45-byte data from the leading position in the relay data RD to be the sensor data SD#1 associated with the terminal identifier DID#1; obtains the 60-byte data successive to the sensor data SD#1 to be the sensor data SD#2 associated with the terminal identifier DID#2; and obtains the 140-byte data successive to the sensor data SD#2 to be the sensor data SD#3 associated with the terminal identifier DID#3.

Using the pattern information as the above allows the wireless base station 30 to extract multiple pieces of sensor data from a single data unit.

The controller 312 stores the obtained sensor data into the communication-network buffer 313. In addition, the controller 312 controls the wired communication circuit 33 to transmit the sensor data stored in the communication-network buffer 313 to the server 40.

(Operation)

Next, the operation of the wireless communication system 1 will now be described. The description here focuses on transmission of the relay data from the relay station 20 to the wireless base station 30 among various operations in the wireless communication system 1.

Figure 13:
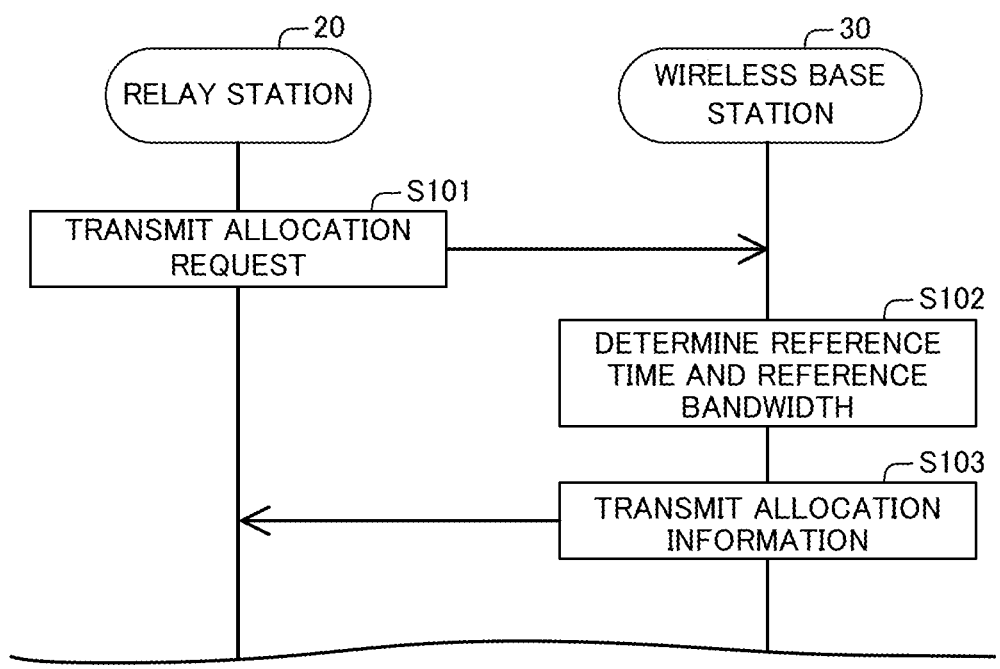
FIG. 13 is a sequence diagram denoting an example of operation of transmission and reception of an allocation request and allocation information in the wireless communication system of FIG. 2.

To begin with, the relay station 20, when being started, transmits the allocation request to the wireless base station 30 (step S101 of FIG. 13). Alternatively, the timing when the relay station 20 transmits the allocation request may be a timing when the relay station 20 first recognizes a terminal 10 that transmits sensor data instead of a timing when the relay station 20 is started.

Upon receipt of the allocation request, the wireless base station 30 determines the reference time and the reference bandwidth (step S102 of FIG. 13). Next, the wireless base station 30 stores therein the allocation information representing the determined reference time and the reference bandwidth, and transmits the allocation information to the relay station 20 (step S103 of FIG. 13). Thereby, the relay station 20 receives the allocation information from the wireless base station 30 and retains the received allocation information.

Execution of the procedure of FIG. 13 is an example of sharing the allocation information between the relay station 20 and the wireless base station 30.

Figure 14:
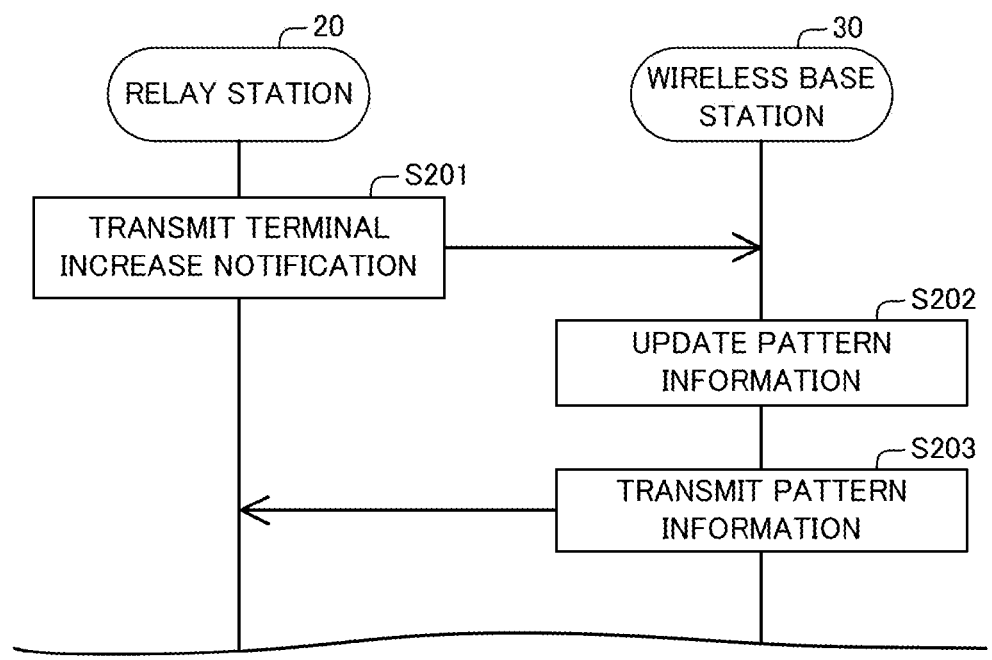
FIG. 14 is a sequence diagram denoting an example of operation of transmission and reception of terminal increase notification and update of pattern information in the wireless communication system of FIG. 2.

Next, upon detection of increase in the number of terminals 10 that transmit sensor data, the relay station 20 transmits the terminal increase notification related to the terminal 10 that is the basis of the increase to the wireless base station 30 (step S201 of FIG. 14). For example, the relay station 20 may detect the increase of a terminal 10 by receiving information containing the terminal identifier from the terminal 10.

Figure 15:
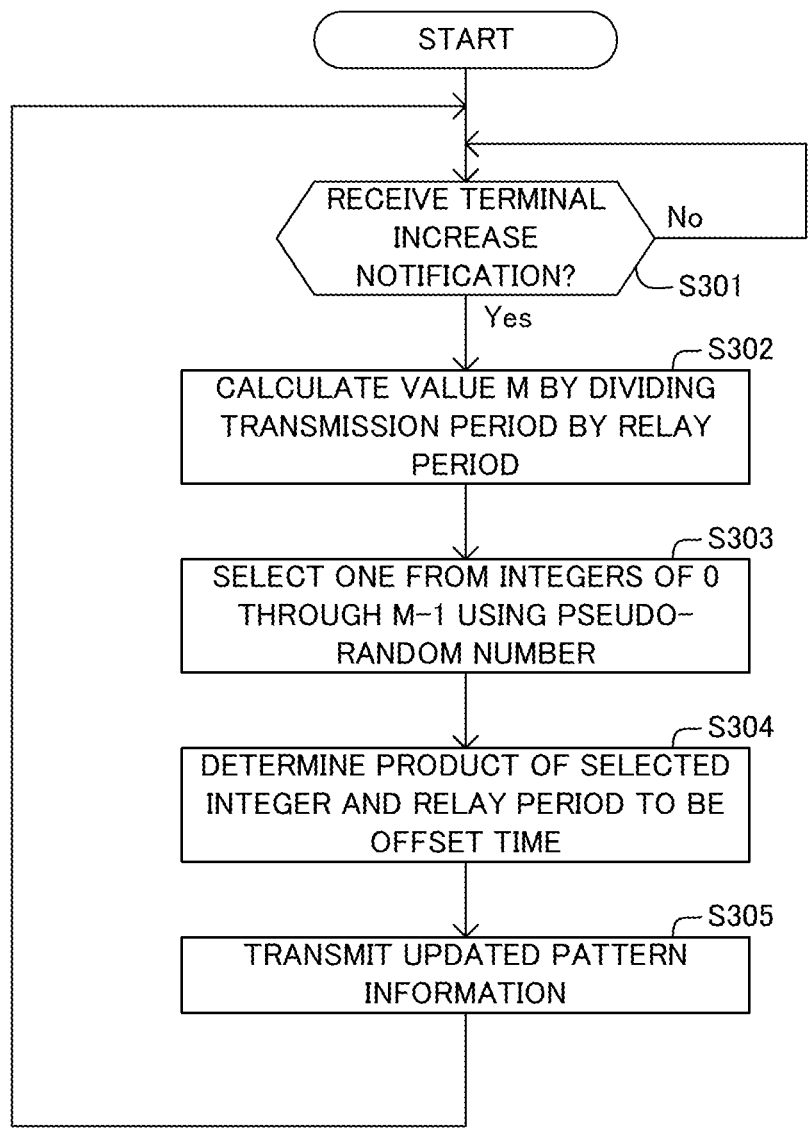
FIG. 15 is a flow diagram illustrating an example of a succession of procedural steps of updating pattern information carried out by the wireless base station of FIG. 2.

The wireless base station 30 executes the procedure of flow diagram of FIG. 15 when being started. For example, the wireless base station 30 is on standby until receiving the terminal increase notification ("No" route in step S301 of FIG. 15). Upon receipt of the terminal increase notification, the wireless base station 30 determines "Yes" in step S301 and proceeds to step S302.

Next, the wireless base station 30 calculates the value M (in this example, 3) by dividing the transmission period (for example 3 [s]) included in the received terminal increase notification by the certain relay period (in this example, 1 [s]) (step S302 of FIG. 15). Then, the wireless base station 30 selects one from the integers of 0 through M−1 using a pseudo random number (step S303 of FIG. 15).

The wireless base station 30 determines the product of the selected integer and the relay period to be the offset time (step S304 of FIG. 15).

After that, the wireless base station 30 updates the pattern information on the basis of the terminal identifier, the size of the sensor data, and the transmission period of the sensor data that are included in the terminal increase notification and the determined offset time (step S202 of FIG. 14). As of this time point, the wireless base station 30 newly retains, for example, pattern information containing the terminal identifier, the size of the sensor data, and the transmission period of the sensor data that are included in the terminal increase notification and the determined offset time. Furthermore, the wireless base station 30 transmits the pattern information after undergoing the updating to the relay station 20 (step S203 of FIG. 14 and step S305 of FIG. 15).

Then the wireless base station 30 returns to step S301 of FIG. 15 and repeats the procedure of steps S301-S305.

Thereby, the relay station 20 receives the pattern information from the wireless base station 30 and retains the received pattern information.

Execution of the procedure of FIG. 14 is an example of sharing the pattern information between the relay station 20 and the wireless base station 30.

Alternatively, in step S203 of FIG. 14, the wireless base station 30 may transmit only the part, that is changed by the terminal increase notification, of the pattern information. In cases where the relay station 20 detects increase of a terminal 10 that transmits the sensor data, the relay station 20 may determine the offset time, update the pattern information, and transmit the pattern information after undergoing the updating instead of the procedure of FIG. 14.

Figure 16:
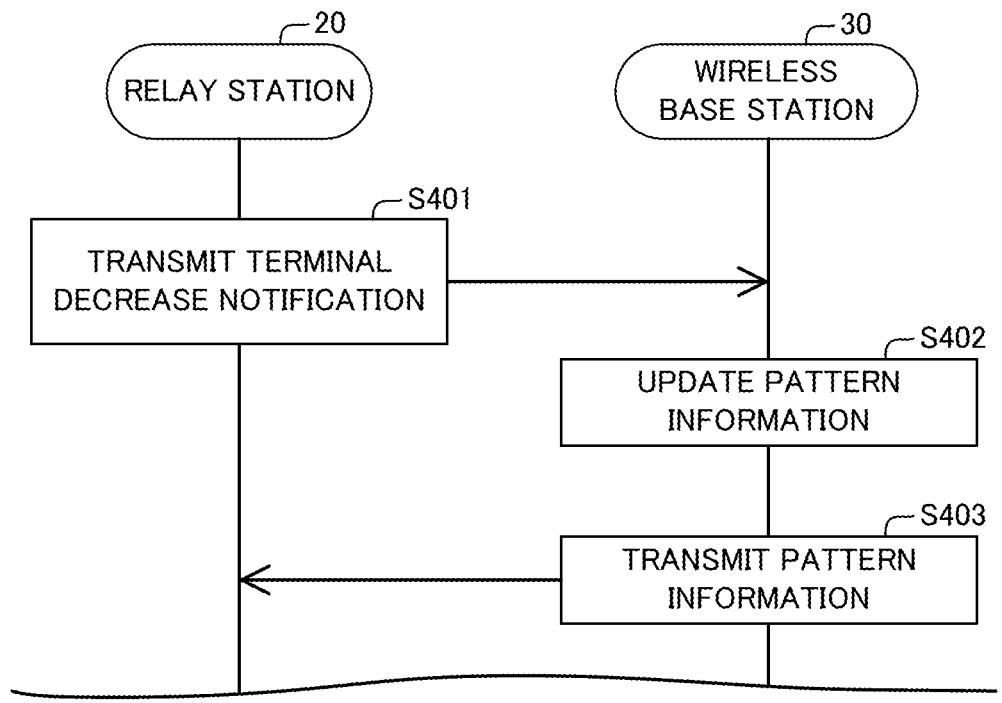
FIG. 16 is a sequence diagram denoting an example of operation of transmission and reception of terminal decrease notification and update of pattern information in the wireless communication system of FIG. 2.

Upon detection of decrease in the number of terminals 10 that transmit sensor data, the relay station 20 transmits the terminal decrease notification related to the terminal 10 that is the basis of the decrease to the wireless base station (step S401 of FIG. 16). For example, the relay station 20 may detect the decrease of a terminal 10 by receiving no sensor data from the terminal 10 any longer.

Upon receipt of the terminal decrease notification from the relay station 20, the wireless base station 30 deletes the terminal identifier, the size of the sensor data, the transmission period of the sensor data and the offset time that are associated with the terminal identifier included in the terminal decrease notification from the retained pattern information. Thereby, the wireless base station 30 updates the pattern information (step S402 of FIG. 16).

After updating the pattern information, the wireless base station 30 transmits the pattern information after undergoing the updating to the relay station 20 (step S403 of FIG. 16). Thereby, the relay station 20 receives the pattern information from the wireless base station 30 and retains the received pattern information.

Here, execution of the procedure of FIG. 16 is an example of sharing the pattern information between the relay station 20 and the wireless base station 30.

In case where the relay station 20 detects the decrease in the number of terminals 10 that transmit sensor data without performing step S403, the relay station 20 may update the pattern information in the same manner as performed by the wireless base station 30. In this case, the wireless base station 30 may transmit a positive response (e.g., information representing Acknowledgement) instead of the pattern information. Furthermore, instead of performing the procedure of FIG. 16, in cases where the relay station 20 detects the decrease in the number of terminals 10 that transmit sensor data, the relay station 20 may update the pattern information and transmit the updated pattern information to the wireless base station 30.

Figure 17:
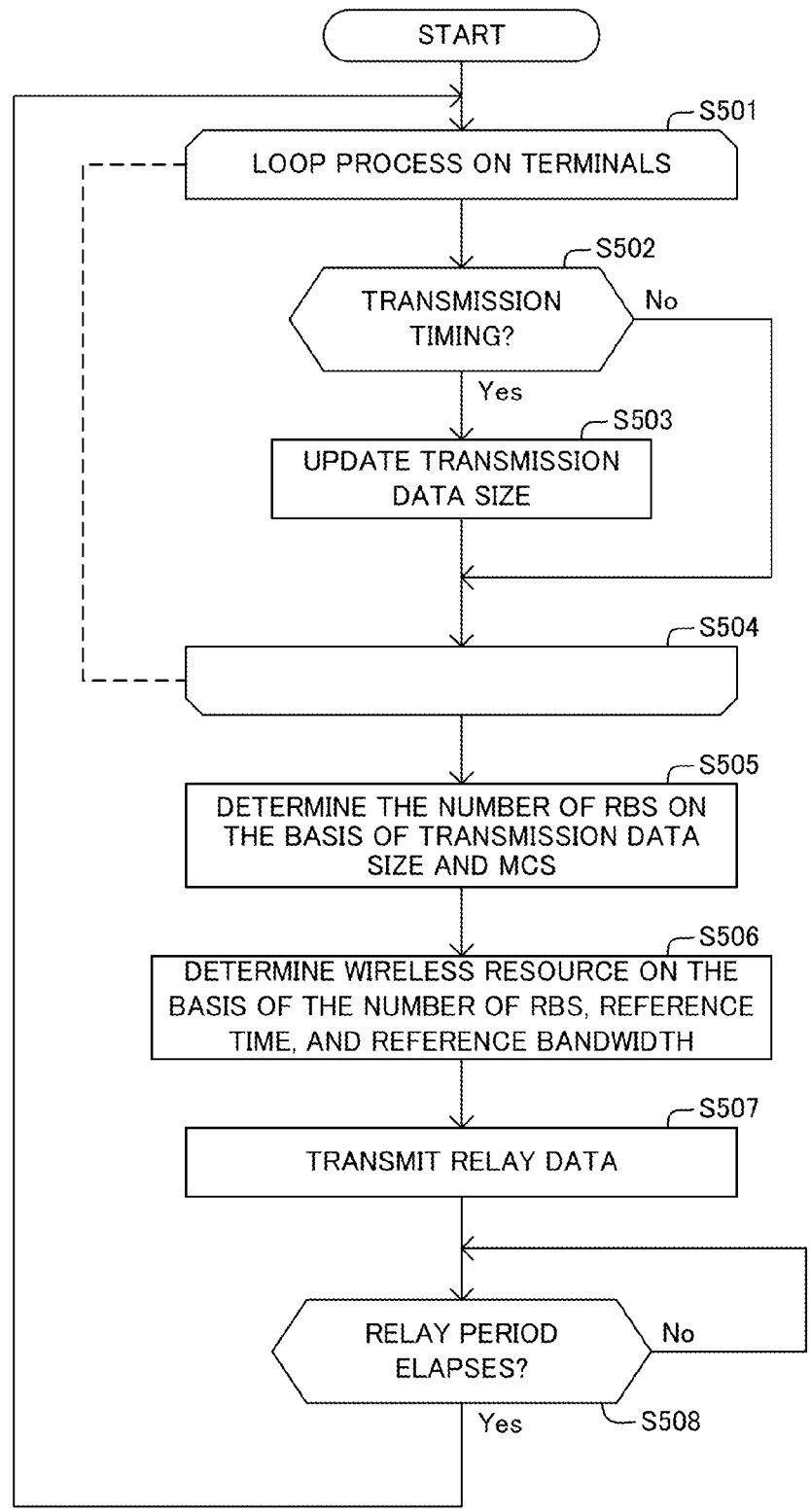
FIG. 17 is a flow diagram illustrating an example of a succession of procedural steps of transmitting of relay data performed by the relay station of FIG. 2.

The relay station 20 carries out the procedure of the flow diagram of FIG. 17 at the processing reference timing. First of all, the relay station 20 sequentially carries out loop processes for the multiple terminals 10-1, . . . , 10-N identified by the terminal identifiers included in the pattern information (steps S501-S504 of FIG. 17).

In each loop process of the loop processes, the relay station 20 determines, on the basis of the pattern information, whether the current time point is a timing (transmission timing) at which the relay station 20 transmits the sensor data of a terminal 10 for the loop process (step S502 of FIG. 17). To transmit the relay data including the sensor data is an example of transmitting the sensor data.

When the current time point is the transmission timing, the relay station 20 determines "Yes" and updates the transmission data size (step S503 in FIG. 17). In the first embodiment, the relay station 20 adds the size of the sensor data of the terminal 10 for the loop process to the retained transmission data size. The transmission data size of the first embodiment is set to be "zero" when the loop processes are started. Then the relay station 20 moves to step S504 of FIG. 17.

On the other hand, when the current time point is not the transmission timing, the relay station 20 determines "No" in step S502 and moves to step S504 of FIG. 17 without updating the transmission data size.

The relay station 20 accomplishes the loop processes (i.e., steps S501-S504) for all the terminals 10-1, . . . , 10-N, and then moves to step S505. In the first embodiment, the transmission data size that the relay station 20 retains at this time point is the same as the size of the relay data to be transmitted in step S507 described below.

Next, the relay station 20 determines the number of RBs to be used for the transmission of the relay data from the relay station 20 to the wireless base station 30 on the basis of the retained transmission data size and the MCS represented by the MCS information received from the wireless base station 30 (step S505 of FIG. 17).

Then, the relay station 20 determines the wireless resource to be allocated to the transmission of the relay data from the relay station 20 to the wireless base station 30 on the basis of the allocation information received from the wireless base station 30 and the determined number of RBs (step S506 of FIG. 17).

After that, the relay station 20 generates the relay data containing the sensor data received from one or more terminals 10 the transmission timing of which is the current time point on the basis of the pattern information. Then, the relay station 20 transmits the generated relay data to the wireless base station 30 using the determined wireless resources (step S507 of FIG. 17).

The relay station 20 comes into standby until the relay period elapses ("No" route of step S508 of FIG. 17). After the relay period elapses, the relay station 20 returns to step S501 and repeats the procedure of steps S501-S508.

Figure 18:
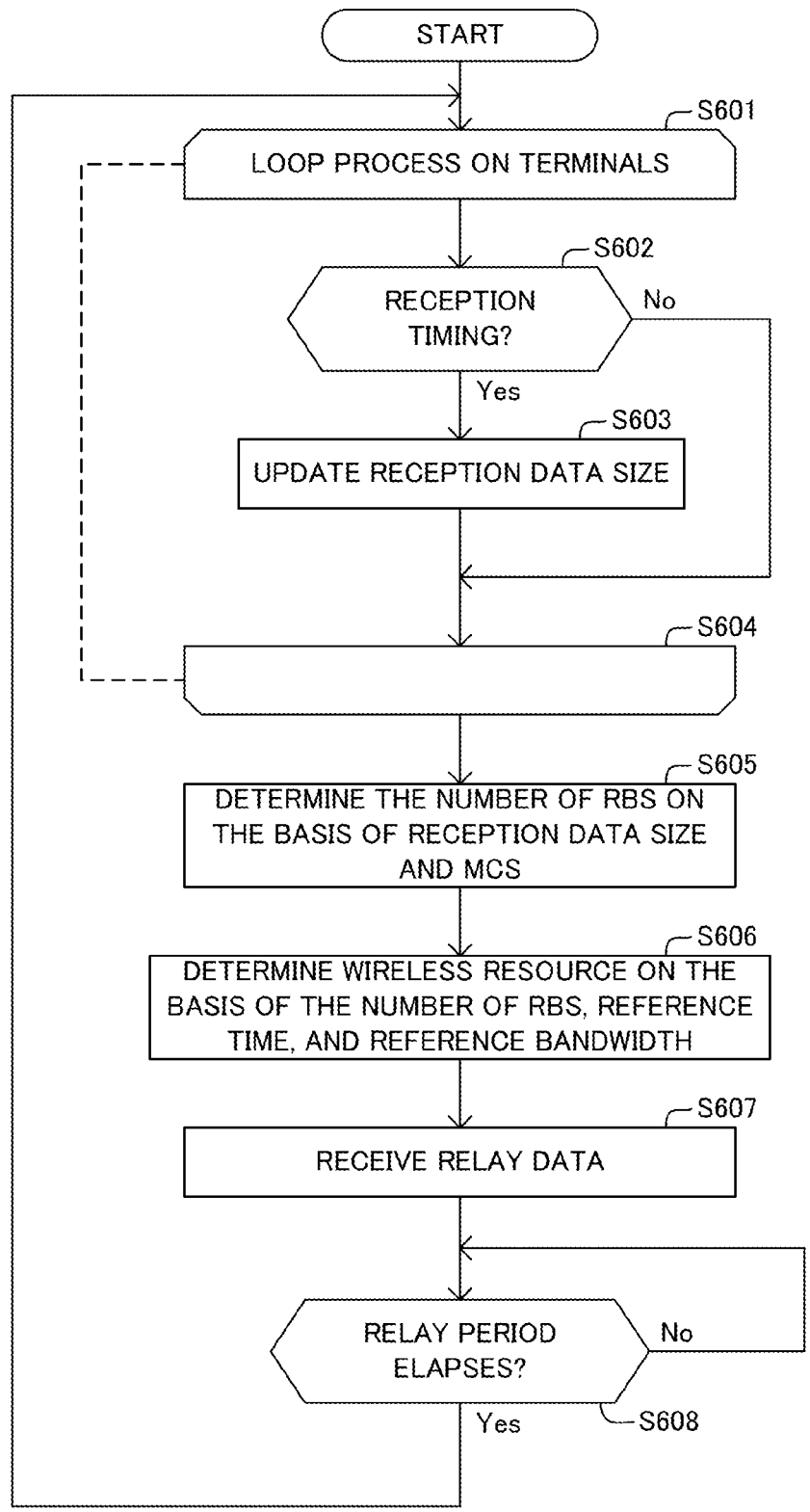
FIG. 18 is a flow diagram illustrating an example of a succession of procedural steps of receiving relay data performed by the wireless base station of FIG. 2.

The wireless base station 30 carries out the procedure of the flow diagram of FIG. 18 at the processing reference timing. First of all, the wireless base station 30 sequentially carries out loop processes for the multiple terminals 10-1, . . . , 10-N identified by the terminal identifiers included in the pattern information (steps S601-S604 of FIG. 18).

In each loop process of the loop processes, the wireless base station 30 determines, on the basis of the pattern information, whether the current time point is a timing (reception timing) at which the wireless base station 30 receives the sensor data of a terminal 10 for the loop process (step S602 of FIG. 18). To receive the relay data including the sensor data is an example of receiving the sensor data.

When the current time point is the reception timing, the wireless base station 30 determines "Yes" and updates the reception data size (step S603 in FIG. 18). In the first embodiment, the wireless base station 30 adds the size of the sensor data of the terminal 10 for the loop process to the retained reception data size. The reception data size of the first embodiment is set to be "zero" when the loop processes are started. Then the wireless base station 30 moves to step S604 of FIG. 18.

On the other hand, when the current time point is not the reception timing, the wireless base station 30 determines "No" in step S602 and moves to step S604 of FIG. 18 without updating the reception data size.

The wireless base station 30 accomplishes the loop processes (i.e., steps S601-S604) for all the terminals 10-1, . . . , 10-N, and then moves to step S605. In the first embodiment, the reception data size that the wireless base station 30 retains at this time point is the same as the size of the relay data to be received in step S607 described below.

Next, the wireless base station 30 determines the number of RBs to be used for reception of the relay data from the relay station 20 to the wireless base station 30 on the basis of the retained reception data size and the MCS represented by the MCS information transmitted to the relay station 20 (step S605 of FIG. 18).

Then, the wireless base station 30 determines the wireless resource to be allocated to the reception of the relay data from the relay station 20 to the wireless base station 30 on the basis of the allocation information transmitted to the relay station 20 and the determined number of RBs (step S606 of FIG. 18). Subsequently, the wireless base station 30 receives the relay data from the relay station 20 using the determined wireless resource (step S607 of FIG. 18).

Then, the wireless base station 30 comes into standby until the relay period elapses ("No" route of step S608 of FIG. 18). After the relay period elapses, the wireless base station 30 returns to step S601 and repeats the procedure of steps S601-S608.

Figure 19:
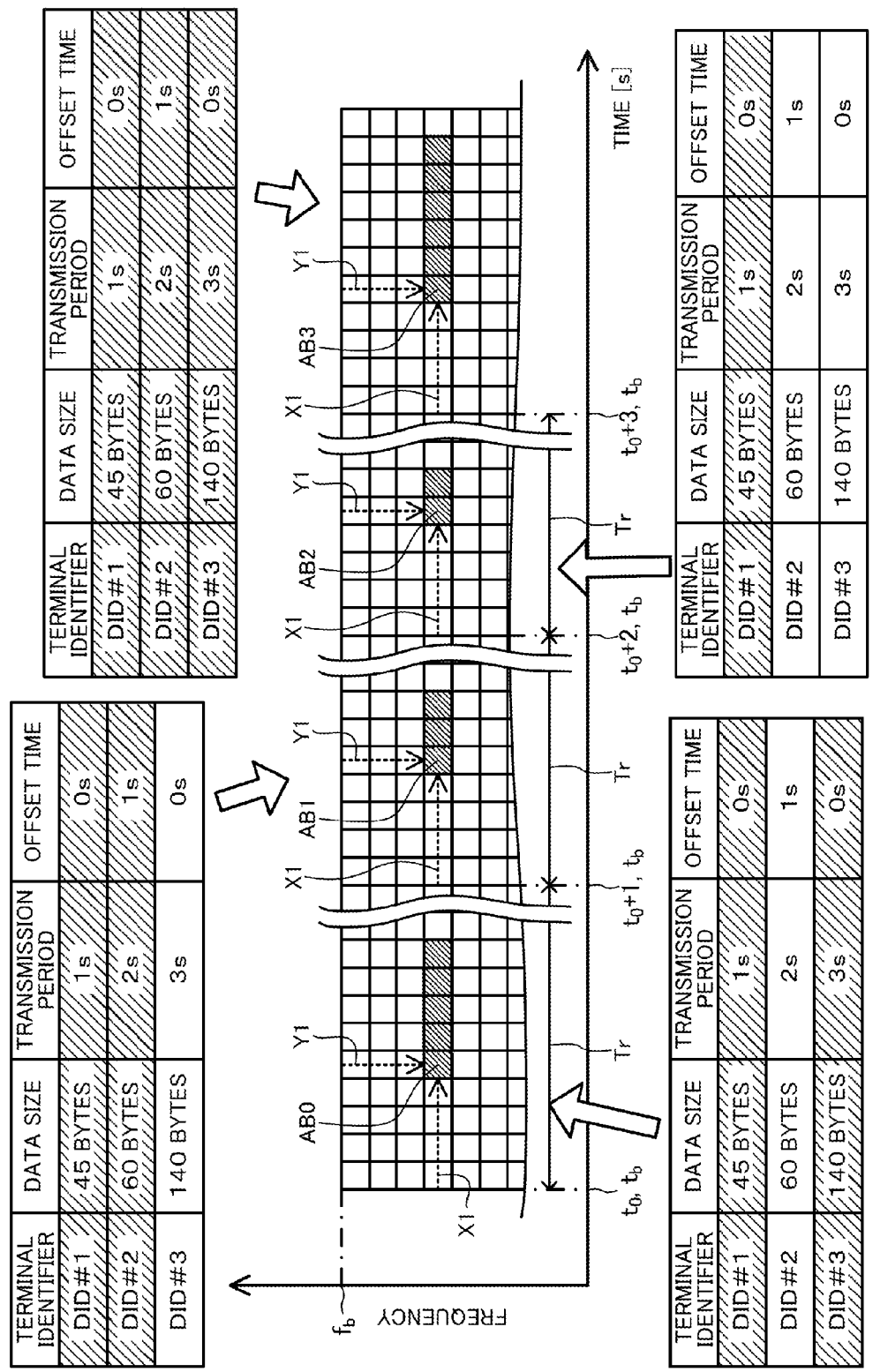
FIG. 19 is a diagram illustrating an example of a wireless resource allocated to transmission of relay data in the wireless communication system of FIG. 2.

FIG. 19 denotes an example of wireless resource allocated to the transmission of the relay data from the relay station 20 to the wireless base station 30. In this example, the allocation information is assumed that the number X1 of the RBs in the time direction represented by the reference time is four and the number Y1 of RBs in the frequency direction represented by the reference bandwidth is three as illustrated in FIG. 7. The symbol $t_b$ represents the allocation reference timing and the symbol $f_b$ represents the allocation reference frequency.

Furthermore, in this example, it is assumed that the relay station 20 and the wireless base station 30 shares the pattern information of FIG. 9 and that a single RB can carry 42-byte transmission data.

At the processing reference timing $t_0$ [s], the relay station 20 transmits the relay data containing sensor data associated with terminal identifiers DID#1 and DID#3 associated with the offset time being zero (0 [s]) to the wireless base station 30. The size of the relay data is 185 bytes (=45 bytes+140 bytes), which means that the transmission of the relay data uses five resource blocks AB0.

The five resource blocks AB0 include a RB having a leading time being later by the time corresponding to the number X1 of RBs than the allocation reference timing $t_b$ and the timing $t_0$ [s], and further include a RB having a highest frequency being lower by the bandwidth corresponding to the number Y1 of RBs than the allocation reference frequency $f_b$. In addition, the five resource blocks AB0 are successive in the time direction.

Next, description will now be made in relation to the wireless resource at the time point $t_0+1$ [s] at which the relay period Tr (in this example, 1 [s]) elapses from the processing reference timing $t_0$. At this time point $t_0+1$ [s], the relay station 20 transmits the relay data containing sensor data associated with terminal identifiers DID#1 associated with the transmission period of one second (1 [s]) and DID#2 associated with the offset time being one second (1 [s]) to the wireless base station 30. The size of the relay data is 105 bytes (=45 bytes+60 bytes), which means that the transmission of the relay data uses three resource blocks AB1.

The three resource blocks AB1 include a RB having a leading time being later by the time corresponding to the number X1 of RBs than the allocation reference timing $t_b$ and the timing $t_0+1$ [s], and further include a RB having a highest frequency being lower by the bandwidth corresponding to the number Y1 of RBs than the allocation reference frequency $f_b$. In addition, the three resource blocks AB1 are successive in the time direction.

Likewise, description will now be made in relation to the wireless resource at the time point $t_0+2$ [s] at which twice the relay period Tr elapses from the processing reference timing $t_0$. At this time point $t_0+2$ [s], the relay station 20 transmits the relay data containing sensor data associated with terminal identifier DID#1 associated with the transmission period of one second (1 [s]) to the wireless base station 30. The size of the relay data is 45 bytes, which means that the transmission of the relay data uses two resource blocks AB2.

The two resource blocks AB2 include a RB having a leading time being later by the time corresponding to the number X1 of RBs than the allocation reference timing $t_b$ and the timing $t_0+2$ [s], and further include a RB having a highest frequency being lower by the bandwidth corresponding to the number Y1 of RBs than the allocation reference frequency $f_b$. In addition, the two resource blocks AB2 are successive in the time direction.

Likewise, description will now be made in relation to the wireless resource at the time point $t_0+3$ [s] at which three times the relay period Tr elapses from the processing reference timing $t_0$. At this time point $t_0+3$ [s], the relay station 20 transmits the relay data containing sensor data associated with terminal identifiers DID#1-DID#3 to the wireless base station 30. The size of the relay data is 245 bytes (=45 bytes+60 bytes+140 bytes), which means that the transmission of the relay data uses six resource blocks AB3.

The six resource blocks AB3 include a RB having a leading time being later by the time corresponding to the number X1 of RBs than the allocation reference timing $t_b$ and the timing $t_0+3$ [s], and further include a RB having a highest frequency being lower by the bandwidth corresponding to the number Y1 of RBs than the allocation reference frequency $f_b$. In addition, the six resource blocks AB3 are successive in the time direction.

As described above, the relay station 20 of the first embodiment transmits sensor data to the wireless base station 30 in accordance with the allocation pattern of a wireless resource based on the size and the transmission period of the sensor data of each individual terminal 10.

This can reduce the control messages used for allocating the wireless resource as compared with cases where the wireless resource is allocated to the transmission of the sensor data from the relay station 20 to the wireless base station 30 for each terminal 10. Consequently, a wireless resource allocated to communication of control messages can be reduced, so that the wireless resource between the relay station 20 and the wireless base station 30 can be efficiently used.

Furthermore, in the wireless communication system 1 of the first embodiment, the wireless resource allocated to the transmission of the relay data is an element of a wireless communication band identified by time and frequency. The element is successive in time and frequency in the wireless communication band.

This makes the relay station 20 possible to transmit relay data, which is generated by integrating sensor data from the terminals 10-1, . . . , 10-N using the wireless resource allocated according to the allocation pattern. Accordingly, as compared with cases where the wireless resource is allocated to the transmission of the sensor data from the relay station 20 to the wireless base station 30 for each terminal 10, it is possible to reduce the amount of wireless resource which is allocated to the transmission of the sensor data but does not carry the sensor data.

Furthermore, in the wireless communication system 1 of the first embodiment, the allocation pattern is determined on the basis of the data size pattern representing the pattern of the size of the relay data, the allocation reference timing, the allocation reference frequency, the reference time, and the reference bandwidth.

This configuration makes the wireless base station 30 and the relay station 20 to identify a correct wireless resource allocated to the transmission of the relay data from the relay station 20 to the wireless base station 30 even when the data size varies.

In addition, the relay station 20 and the wireless base station 30 of the first embodiment each determines a wireless resource allocated to the transmission of the relay data on the basis of the MCS used for the transmission of the relay data and the data size pattern.

When the MCS used for the transmission of the relay data is changed, the amount of a wireless resource used for the transmission of the relay data also changes. This has a possibility of not determining an appropriate allocation pattern when the MCS is changed. However, the relay station 20 and the wireless base station 30 of the first embodiment can reflect the change in the MCS used for the transmission of the relay data in the allocation pattern. This means that the relay station 20 and the wireless base station 30 each determines an appropriate allocation pattern.

Furthermore, the wireless communication system 1 of the first embodiment sets an offset time from the processing reference timing to a timing when the sensor data of a terminal 10 is transmitted from the relay station 20 to the wireless base station 30 for each terminal 10. In addition, the allocation pattern is determined on the basis of the size of the sensor data and the transmission period of the sensor data for each terminal 10 and the offset time set for each terminal 10.

This can suppress the fluctuation in the number of pieces of sensor data included in the relay data, which suppresses the fluctuation in the amount of wireless resource allocated to the transmission of the relay data.

Besides, in cases where the number of terminals 10-1, . . . , 10-N is changed, the wireless communication system 1 of the first embodiment updates the allocation pattern based on the change.

Even when the number of terminals 10 that transmit sensor data to the relay station 20 is changed, this can rapidly reflect the change in the allocation pattern. Consequently, the wireless resource can be efficiently used after the number of terminals 10 that transmit sensor data to the relay station 20 is changed.

The wireless communication system 1 may omit setting the offset time for each terminal 10. In this case, the pattern information does not include the offset time, and the wireless base station 30 may omit transmitting the pattern information to the relay station 20.

Alternatively, the time point identified by the allocation reference timing and the reference time may be used as the last timing or a midpoint timing of the wireless resource allocated to the transmission of the relay data. Further alternatively, the frequency identified by the allocation reference frequency and the reference bandwidth may be used as the lowest or a midpoint frequency of the wireless resource allocated to the transmission of the relay data.

Second Embodiment

Next, a wireless communication system according to the second embodiment will now be described. The wireless communication system of the second embodiment is different from the wireless communication system 1 of the first embodiment in the point that multiple terminals are grouped into multiple groups and the allocation information and the pattern information are managed for each group. The following description will focus on this difference.

The wireless communication system 1 of the second embodiment groups the multiple terminals 10-1, . . . , 10-N into multiple groups and further manages the allocation information and the pattern information for each group. For this management of each group, the wireless communication system 1 may associate the allocation information and the pattern information with a corresponding group identifier which identifies a group. In this case, the wireless communication system 1 may include a group identifier in the allocation information and the pattern information.

In the second embodiment, the relay station 20 transmits the allocation request for each group and the wireless base station 30 determines the reference time and the reference bandwidth for each group. In the second embodiment, the wireless base station 30 determines a common reference time and different reference bandwidths for the multiple groups.

Figure 20:
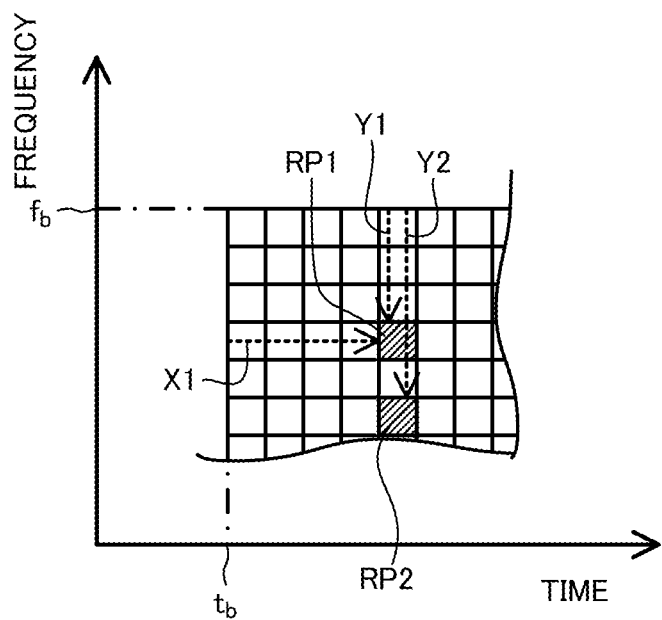
FIG. 20 is a diagram illustrating an example of a wireless resource allocated to transmission of relay data in a wireless communication system according a second embodiment.

For example, as illustrated in FIG. 20, in cases where the number of groups is two, the allocation information for the first group and that for the second group identify resource blocks RP1 and RP2, respectively. FIG. 20 is an example of the allocation information including the reference time representing the number X1 of RBs in the time direction being four for each group and including the reference bandwidth representing the number of Y1 of RBs in the frequency direction being three for the first group and five for the second group. The number of groups may be, of course, three of more.

The wireless base station 30 transmits allocation information representing the determined reference time and the determined reference bandwidth to the relay station 20 for each group. The relay station 20 transmits the terminal increase notification and the terminal decrease notification to the wireless base station 30 for each group. The wireless base station 30, for each group, updates the pattern information and transmits the pattern information after undergoing the updating to the relay station 20.

The relay station 20 performs determination of a wireless resource allocated to the transmission of the relay data, generation of the relay data, and the transmission of the relay data for each group.

The wireless base station 30 determines a wireless resource to be allocated to the reception of the relay data and receive the relay data for each group.

As described above, the wireless communication system 1 of the second embodiment can efficiently use the wireless resource likewise the first embodiment.

Figure 21:
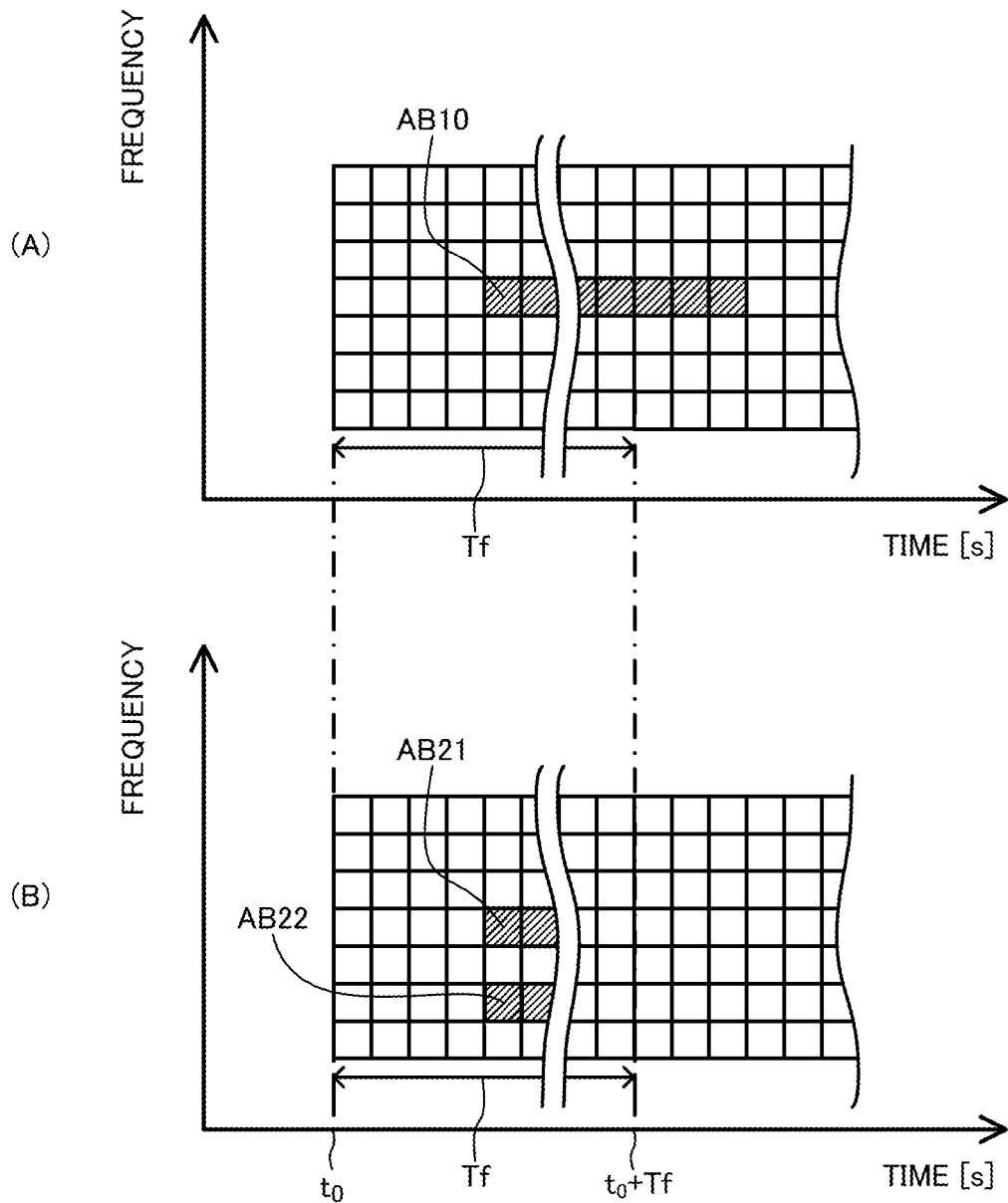
FIG. 21 is a diagram illustrating an example of a wireless resource allocated to transmission of relay data.

As illustrated in FIG. 21(A), in cases where the size of the relay data increases in the wireless communication system 1 of the first embodiment, the wireless resource AB10 allocated to the transmission of the relay data are included in multiple wireless frames. The term "Tf" represents the time length of a single wireless frame.

In contrast, the wireless communication system 1 of the second embodiment can reduce the size of the single piece of relay data. Accordingly, as illustrated in FIG. 21(B), the wireless resources AB21 and AB22 allocated to the transmission of the relay data can be included in a single wireless frame.

Besides, the wireless communication system 1 of the second embodiment can separate the wireless resources allocated to the transmission of the relay data as compared with the wireless communication system 1 of the first embodiment. Accordingly, in cases where the quality of communication using a particular RB is low, it is possible to inhibit the quality of the communication of the entire relay data from lowering. In other words, it is possible to suppress the influence of lowering of the communication using the particular RB on the quality of the communication of the entire relay data.

The wireless communication system 1 may provide different priorities to the multiple groups. In this case, the wireless communication system 1 sets the MCS used for the transmission of the relay data to be a MCS capable of higher-quality communication as a group for the relay data is provided with a higher priority. For example, if a first group is provided with a higher priority than the priority for a second group, the wireless communication system 1 uses QPSK as the MSC for the first group while uses 64QAM as the MCS for the second group.

The wireless communication system 1 may group the multiple terminals 10 into the groups on the basis of at least one of the terminal identifier, the size of the sensor data, and the transmission period of the sensor data.

Alternatively, the terminal 10 may transmit multiple pieces of sensor data different in at least one of the size and the transmission period. In this case, the wireless communication system 1 may share allocation information and pattern information, allocate a wireless resource, and transmit the relay data likewise the foregoing embodiments by using a data identifier to identify a piece of sensor data. Further alternatively, the terminal 10 may periodically transmit data except for the sensor data to the relay station 20. In this case, the wireless communication system 1 may deal with the data except for the sensor data in the same manner as the sensor data.

According to the above disclosure, the wireless resource can be efficiently used.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A wireless communication system comprising:
 a wireless base station; and
 a relay station that receives data periodically transmitted from each of a plurality of terminals, and transmits the received data to the wireless base station in accordance with an allocation pattern of a wireless resource, wherein
 an offset time is set for each of the plurality of terminals, the offset time representing a time period from a processing reference timing to a timing when the data of each of the plurality of terminals is transmitted from the relay station to the wireless base station; and
 the allocation pattern is determined on the basis of size of the data for each of the plurality of terminals, period of the transmission for each of the plurality of terminals, and the offset time set for each of the plurality of terminals.

2. The wireless communication system according to claim 1, wherein:
a wireless resource allocated to the transmission of the data from the relay station to the wireless base station is an element belonging to a wireless communication band identified by time and frequency, the element having successive time and successive frequency in the wireless communication band; and
the allocation pattern is determined on the basis of a data size pattern, a reference timing of the wireless resource and a reference frequency of the wireless resource, the data size pattern representing a pattern of the size of the data to be transmitted from the relay station to the wireless base station.

3. The wireless communication system according to claim 2, wherein
the wireless resource allocated to the transmission of the data from the relay station to the wireless base station is determined on the basis of the data size pattern and a scheme of modulating and coding to be used for the transmission of the data from the relay station to the wireless base station.

4. The wireless communication system according to claim 1, wherein
when the number of the plurality of terminals is changed, the allocation pattern is updated in accordance with the change.

5. The wireless communication system according to claim 1, wherein the wireless base station obtains the data of each of the plurality of terminals from the data received from the relay station in accordance to the allocation pattern.

6. The wireless communication system according to claim 1, wherein:
the plurality of terminals are grouped into a plurality of groups; and
the relay station transmits the data transmitted from each terminal of each of the plurality of groups in accordance with an allocation pattern determined for the group.

7. A method for wireless communication comprising:
at a relay station,
receiving data periodically transmitted from each of a plurality of terminals; and
transmitting the received data to a wireless base station in accordance with an allocation pattern of a wireless resource, wherein
an offset time is set for each of the plurality of terminals, the offset time representing a time period from a processing reference timing to a timing when the data of each of the plurality of terminals is transmitted from the relay station to the wireless base station; and
the allocation pattern is determined on the basis of size of the data for each of the plurality of terminals, period of the transmission for each of the plurality of terminals, and the offset time set for each of the plurality of terminals.

8. The method of wireless communication according to claim 7, wherein
a wireless resource allocated to the transmission of the data from the relay station to the wireless base station is an element belonging to a wireless communication band identified by time and frequency, the element having successive time and successive frequency in the wireless communication band; and
the allocation pattern is determined on the basis of a data size pattern, a reference timing of the wireless resource and a reference frequency of the wireless resource, the data size pattern representing a pattern of the size of the data to be transmitted from the relay station to the wireless base station.

9. The method of wireless communication according to claim 8, wherein
the wireless resource allocated to the transmission of the data from the relay station to the wireless base station is determined on the basis of the data size pattern and a scheme of modulating and coding to be used for the transmission of the data from the relay station to the wireless base station.

10. A relay station comprising:
a receiver that receives data periodically transmitted from each of a plurality of terminals; and
a transmitter that transmits the received data to a wireless base station in accordance with an allocation pattern of a wireless resource, wherein
an offset time is set for each of the plurality of terminals, the offset time representing a time period from a processing reference timing to a timing when the data of each of the plurality of terminals is transmitted from the relay station to the wireless base station; and
the allocation pattern is determined on the basis of size of the data for each of the plurality of terminals, period of the transmission for each of the plurality of terminals, and the offset time set for each of the plurality of terminals.

11. The relay station according to claim 10, wherein:
a wireless resource allocated to the transmission of the data from the relay station to the wireless base station is an element belonging to a wireless communication band identified by time and frequency, the element having successive time and successive frequency in the wireless communication band; and
the allocation pattern is determined on the basis of a data size pattern, a reference timing of the wireless resource and a reference frequency of the wireless resource, the data size pattern representing a pattern of the size of the data to be transmitted from the relay station to the wireless base station.

12. The relay according to claim 11, wherein
the wireless resource allocated to the transmission of the data from the relay station to the wireless base station is determined on the basis of the data size pattern and a scheme of modulating and coding to be used for the transmission of the data from the relay station to the wireless base station.

13. A wireless base station comprising a receiver that receives data being periodically transmitted from each of a plurality of terminals to a relay station and being transmitted from the relay station in accordance with an allocation pattern of a wireless resource, wherein
an offset time is set for each of the plurality of terminals, the offset time representing a time period from a processing reference timing to a timing when the data of each of the plurality of terminals is transmitted from the relay station to the wireless base station; and
the allocation pattern is determined on the basis of size of the data for each of the plurality of terminals, period of the transmission for each of the plurality of terminals, and the offset time set for each of the plurality of terminals.

14. The wireless base station according to claim 13, wherein
a wireless resource allocated to the transmission of the data from the relay station to the wireless base station is an element belonging to a wireless communication band identified by time and frequency, the element having successive time and successive frequency in the wireless communication band; and the allocation pattern is determined on the basis of a data size pattern, a reference timing of the wireless resource and a reference frequency of the wireless resource, the data size pattern representing a pattern of the size of the data to be transmitted from the relay station to the wireless base station.

15. The wireless base station according to claim 14, wherein the wireless resource allocated to the transmission of the data from the relay station to the wireless base station is determined on the basis of the data size pattern and a scheme of modulating and coding to be used for the transmission of the data from the relay station to the wireless base station.

* * * * *